US006765596B2

(12) United States Patent
Lection et al.

(10) Patent No.: US 6,765,596 B2
(45) Date of Patent: Jul. 20, 2004

(54) MULTI-FUNCTIONAL APPLICATION LAUNCHER WITH INTEGRATED STATUS

(75) Inventors: David B. Lection, Raleigh, NC (US); Mark E. Molander, Cary, NC (US); John L. Scanlon, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 523 days.

(21) Appl. No.: 09/794,641

(22) Filed: Feb. 27, 2001

(65) Prior Publication Data

US 2002/0140742 A1 Oct. 3, 2002

(51) Int. Cl.[7] ................................................ G09G 5/00
(52) U.S. Cl. ........................ 345/835; 345/764; 345/772
(58) Field of Search ................................ 345/864, 865, 345/866, 700, 702, 762–765, 835, 810, 761, 767, 771, 772; 707/1, 102

(56) References Cited

U.S. PATENT DOCUMENTS

| | | | | |
|---|---|---|---|---|
| 4,845,644 | A | | 7/1989 | Anthias et al. ............. 364/521 |
| 5,497,455 | A | * | 3/1996 | Suga et al. ................. 345/835 |
| 5,570,109 | A | * | 10/1996 | Jenson ....................... 345/823 |
| 5,745,110 | A | * | 4/1998 | Ertemalp ..................... 345/764 |
| 5,995,940 | A | * | 11/1999 | Ramaley ........................ 705/9 |
| 6,366,898 | B2 | * | 4/2002 | Taivalsaari et al. ............ 707/1 |
| 6,385,662 | B1 | * | 5/2002 | Moon et al. ................. 719/318 |
| 6,417,874 | B2 | * | 7/2002 | Bodnar ........................ 345/854 |

OTHER PUBLICATIONS

"SilverScreen by PocketSensei", subtitled "the world's most powerful software in the palm of your hand, POCKET-SENSEI SilverScreen 1.0", Internet–published article printed Feb. 15, 2001 (publication date unknown), <http://www.pocketsensei.com/>, 2 pages.

"SilverScreen Feature List", subtitled "the world's most powerful software in the palm of your hand, POCKET-SENSEI Feature List", Internet–published article printed Feb. 15, 2001 (publication date unknown), <http://www-.pocketsensei.com/features.htm>, 2 pages.

Billard E. et al: "A GUI for a manager of Lightweight Processes" Software Engineering Notes, association for Computing Machinery. New York. vol. 20, No. 5, Dec. 1, 1995 pp. 48–50. Page 17, line 42 –p. 18, line 18 fig 2.

Friedmann M: "Tools for Windows NT erformance Monitoring" vol. 24, No. 12, Nov. 12, 1996, pp. 17 – 30.

Mei–Ling Hsu et al: "Building Soft Real–Time Monitors Based on Software Reuse", Engineering of complex Computer systems, 1998. ICECCS '98. Proceedings Fourth IEEE International Conference on Monterey, CA, Aug. 10–14, 98, Los Alamitos, CA.

* cited by examiner

Primary Examiner—John Cabeca
Assistant Examiner—Tadesse Hailu
(74) Attorney, Agent, or Firm—Jeanine S. Ray-Yarletts; Marcia L. Doubet; Gregory M. Doudnikoff

(57) ABSTRACT

User interfaces, methods, systems, and computer program products for improving interactions with users of pervasive computing devices such as personal digital assistants, Web-enabled cellular phones, Web appliances, wearable computing devices, so-called "smart" appliances in the home, and so forth. A multi-functional application launcher is defined that is specifically adapted for use on devices with limited display space and which use pen-based input or other similar input means. This application launcher enables improved navigation, and provides an improved way to show task status information to the device user. Multiple functions per task are supported, and status information is provided, all from an application launcher view.

38 Claims, 20 Drawing Sheets

FIG. 3

300 Start Task
- \*    Start a new instance of this task
- E    Event notification has arrived to start this task

310 Running Task
- \*    Bring selected task of this name to surface of task viewer
- ?    Task is requesting user input
- !    Task has information to show to user

320 Stop Task
- \*    Close selected instance of this task after surfacing view
- !    Task completed with some condition. After surfacing view, terminate.
- C    Task completed. Close task without surfacing view.

330 Stop All Tasks
- \*    Close all instances of this task

MULTI-FUNCTIONAL APPLICATION LAUNCHER WITH INTEGRATED STATUS

BACKGROUND OF THE INVENTION

1. Field of the Invention

The present invention relates to pervasive computing, and deals more particularly with user interfaces, methods, systems, and computer program products for improving a user's interactions with pervasive computing devices by providing an application launcher that is specifically adapted to such devices.

2. Description of the Related Art

Pervasive computing devices are the most rapidly growing class of computing devices available today. Such devices include personal digital assistants ("PDAs"), Web-enabled cellular phones, Web appliances, wearable computing devices, so-called "smart" appliances in the home, and so forth. It is predicted that by the year 2004, pervasive computing devices will be more widely used than personal computers. The reasons for this are evident. The Internet and World Wide Web (hereinafter, "Internet") bring mobility, and mobility dictates a need for portability. As more and more people incorporate these devices into their everyday lives, the cost of such devices becomes more affordable. Now factor in the coming of inexpensive wireless access to the Internet, and it is easy to understand why these pervasive computing devices are becoming ever more popular. (Note: reference herein to "computing" devices is also intended to include devices used primarily for communications or other purposes, such as cellular phones.)

Pervasive computing devices vary in their characteristics. Often, pervasive computing devices are adapted to operation while being held, and many accept user input with a touch-sensitive display screen or via a light pen or other type of stylus. Typically, the display screen on these devices is much more limited in size than the displays available on personal computers. The user interface models that have been developed in recent years to optimize a user's interactions with a more traditional type of computing device therefore do not necessarily adapt well to use with pervasive computing devices. The Palm class of devices appears to have a market leadership position for handheld pervasive computing devices with respect to popularity and usability. However, even within this class of devices there are several drawbacks. For example, A single application launcher paradigm has not yet emerged. Most often, the application launcher used on such devices is very similar to a Windows program manager. In this approach, applications are typically reflected on a workspace using icons. With the constrained viewing space available on most pervasive computing devices, an icon-based display often proves to be inefficient and cumbersome. For example, it may take a considerable amount of time to search for an icon throughout a series of display screens. The SilverScreen® application launcher offers some improvements, for example by providing the ability to drag and drop applications and data to services (such as dragging an application to the trash can to delete it), but is still oriented toward use of application icons and resembles a (very small) Windows desktop. ("SilverScreen" is a registered trademark of PocketSensei.)

Existing application launchers are not optimized for use with a pen or stylus interface. (Hereinafter, the words "pen" and "stylus" are used interchangeably.) They still require the user to search for an application based upon its iconic representation, and then tap the icon to start execution of the application. These existing launchers have often implemented good pen support given their paradigm, but are not specifically adapted nor optimized for a pen-based interface.

The user interfaces of these devices are not optimized for switching from a launched application or task to the application launcher and back. Note that many devices in the Palm class provide a "home" button to enable switching back to the application launcher from a task view: this button would not be needed if a uniform way existed to switch between the launcher and a launched application or task (referred to hereinafter as a "task" for ease of reference).

Accordingly, what is needed are improvements to the user interface of these devices that address the drawbacks of existing solutions.

SUMMARY OF THE INVENTION

An object of the present invention is to provide improvements to the user interface of pervasive computing devices that address the drawbacks of existing solutions.

Another object of the present invention is to provide a user interface for pervasive computing devices that supports improved navigation.

Another object of the present invention is to provide a user interface that is optimized for a pen-based interface.

A further object of the present invention is to provide a user interface that is optimized for handheld devices.

Still another object of the present invention is to provide a user interface that is specifically adapted for devices having a limited display area.

Yet another object of the present invention is to provide a user interface for pervasive computing devices that enables quickly and efficiently switching between an application launcher and a task view.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, in a first aspect the present invention provides a user interface for pervasive computing devices. In one aspect, this user interface comprises a graphical representation of a collection of one or more tasks of the pervasive computing device, and a display area corresponding to the graphical representation of the collection, wherein the display area indicates status information for each of the one or more tasks and also provides accessibility to a plurality of functions for the collection of tasks.

In another aspect, this comprises a multi-functional application launcher view and a plurality of task views, wherein a user of the pervasive computing device selectively navigates between the multi-functional application launcher view and selected ones of the task views. The multi-functional application launcher view comprises: a displayed list of tasks available to the user for execution by the pervasive computing device; and a displayed grid corresponding to the displayed list of tasks, wherein the displayed grid comprises a plurality of columns and a row for each task in the displayed task list. The displayed grid preferably further comprises entries at intersections of the columns and the rows, wherein the entries provide status information for the tasks in the displayed list and enable performing a plurality of actions (e.g. launching tasks) relative to selected ones of the tasks in the displayed list.

The status information preferably includes which tasks are executing, which tasks are requesting input from the user, and which tasks have information to display to the user. The status information may also include a notification that a particular task should be started by the user. In this latter case, the notification may be received because of an event which occurred in another task or perhaps because a message arrived for the user, in which case the message indicates that the particular task should be started. The message may optionally include input values to be used by the particular task when it is started. The input values may be encoded within a structured markup language document or other means.

The status information may also include which tasks have completed normally, and/or which tasks have completed abnormally. In the latter case, the user may see the task view of a selected one of the tasks that have completed abnormally by activating the entry providing the status information of the selected task.

The actions that may be performed preferably include starting execution of a selected task and surfacing the task view for a selected task, and may also include stopping execution of a selected task. Preferably, entries in the grid may be selectively activated by the user to perform the actions. The activation may comprise tapping a selected entry with a stylus or pen input device. The actions may also include stopping execution of a selected group of tasks, in which case the selected group may comprise multiple instances of a particular task from the displayed list.

A graphical selection area may be provided on the task view for a selected task where this selection area may be activated by the user to return to the multi-function application launcher view.

In yet another aspect, the present invention provides methods, systems, and computer program products for providing an improved user interface for pervasive computing devices. This aspect preferably comprises displaying a multi-functional application launcher view, and enabling a user of the pervasive computing device to selectively navigate between the multi-functional application launcher view and selected ones of a plurality of task views. Displaying the multi-functional application launcher view preferably comprises displaying a list of tasks available to the user for execution by the pervasive computing device, and displaying a grid corresponding to the displayed list of tasks, wherein the displayed grid comprises a plurality of columns and a row for each task in the displayed task list. The columns preferably correspond to life cycle points of the displayed list of tasks, and this aspect may further comprise displaying entries at selected intersections of the columns and the rows, wherein the entries provide status information about particular life cycle points of the task associated with that row and/or graphical depictions of available actions for particular life cycle points of the task associated with that row. Optionally, the user may be allowed to modify the life cycle points and/or to modify the graphical depictions of available actions. The graphical depictions may be activated to perform actions for particular life cycle points of the task associated with that row. A selected displayed entry may be revised when the task associated with that row has different status information or when the task associated with that row has a different available action. In this case, an application programming interface invocation may be received which indicates the different status or available action.

Optionally, a graphical indication may be displayed on the multi-functional application launcher view when the displayed list of tasks exceeds a display capacity of the pervasive computing device.

The actions in this aspect preferably include starting execution of a selected task and surfacing the task view for a selected task, and may also include stopping execution of a selected task. The status information preferably includes which tasks are executing, which tasks are requesting input from the user, and which tasks have information to display to the user. A plurality of instances of a particular task may be executing, in which case surfacing a task view preferably further comprises surfacing the task view of a selected one of the plurality when the user activates the graphical depiction for surfacing the task view of the particular task. The particular one may be, for example, the instance which was most recently viewed by the user. Or, if the activated graphical depiction indicates that input is requested from the user, then the particular one may be the instance which is requesting the input. Or, if the activated graphical depiction indicates that information is available for presenting to the user, then the particular one may be the instance which has the available information. As yet another alternative, the particular one may be selected by the user. In this latter case, the activated graphical depiction preferably indicates presence of the plurality, and a selectable representation of the plurality is presented to the user in response to the activation of the graphical depiction. The particular one is then preferably the instance which is selected by the user from the selectable representation.

The user of the pervasive computing device may selectively navigate between the multi-functional application launcher view and selected task views.

The present invention will now be described with reference to the following drawings, in which like reference numbers denote the same element throughout.

BRIEF DESCRIPTION OF THE DRAWINGS

FIG. 3 provides a list of command and status symbols that may be supported by an implementation of the present invention;

DESCRIPTION OF PREFERRED EMBODIMENTS

The present invention provides improvements to the user interface of pervasive computing devices. A multi-functional application launcher is defined that is specifically adapted for use on devices with limited display space and which use pen-based input or other similar input means. This application launcher enables improved navigation, and provides an improved way to show task status information to the device user. In particular, the multi-function application launcher of the present invention reflects task status information on the same view which supports launching tasks. The advantages of this new user interface will become clear from the following description of the novel features of the present invention.

Figure 1A:
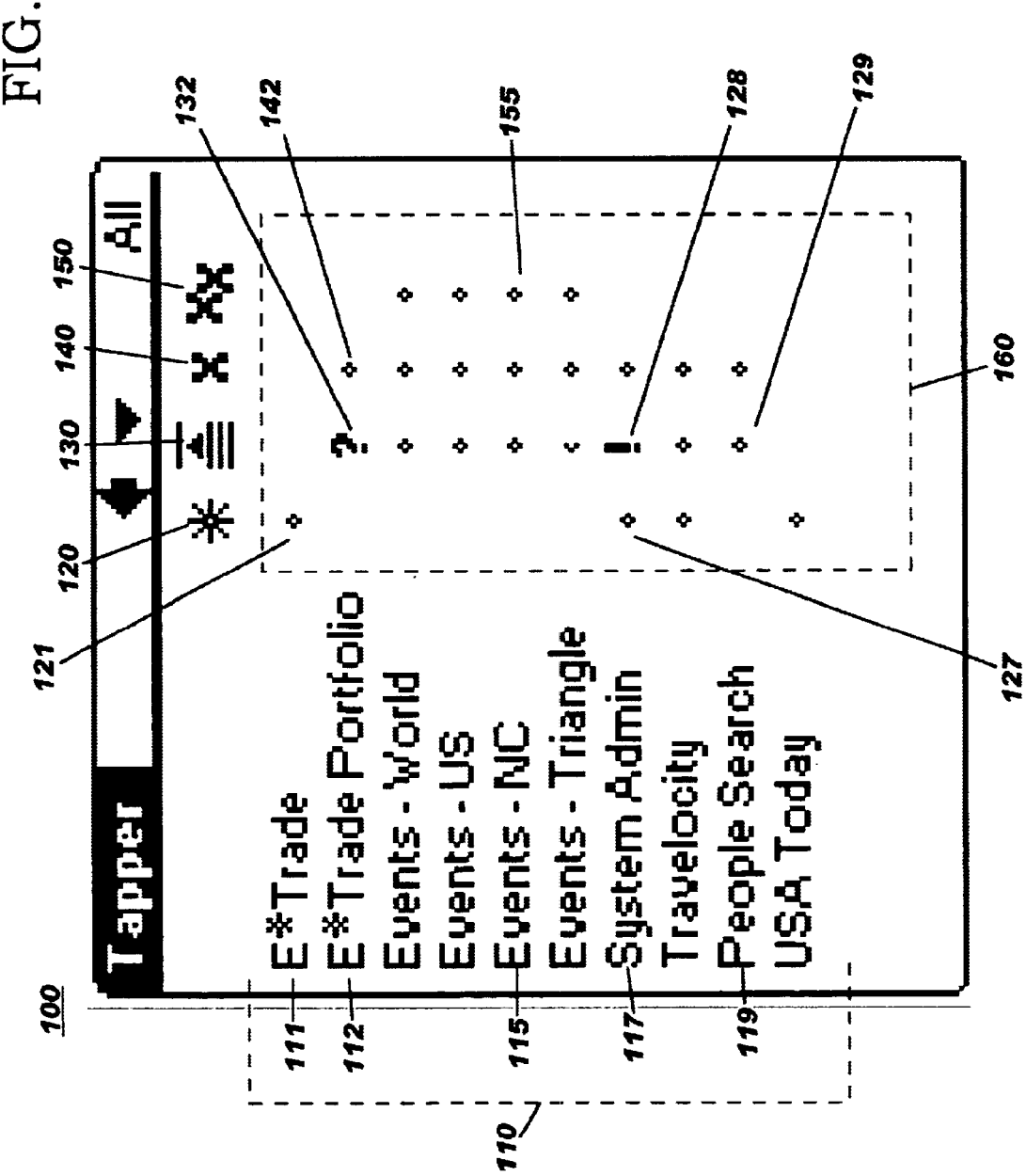
FIGS. 1A–1E illustrate various aspects of an improved user interface for pervasive computing devices, according to the present invention.
Figure 1B:
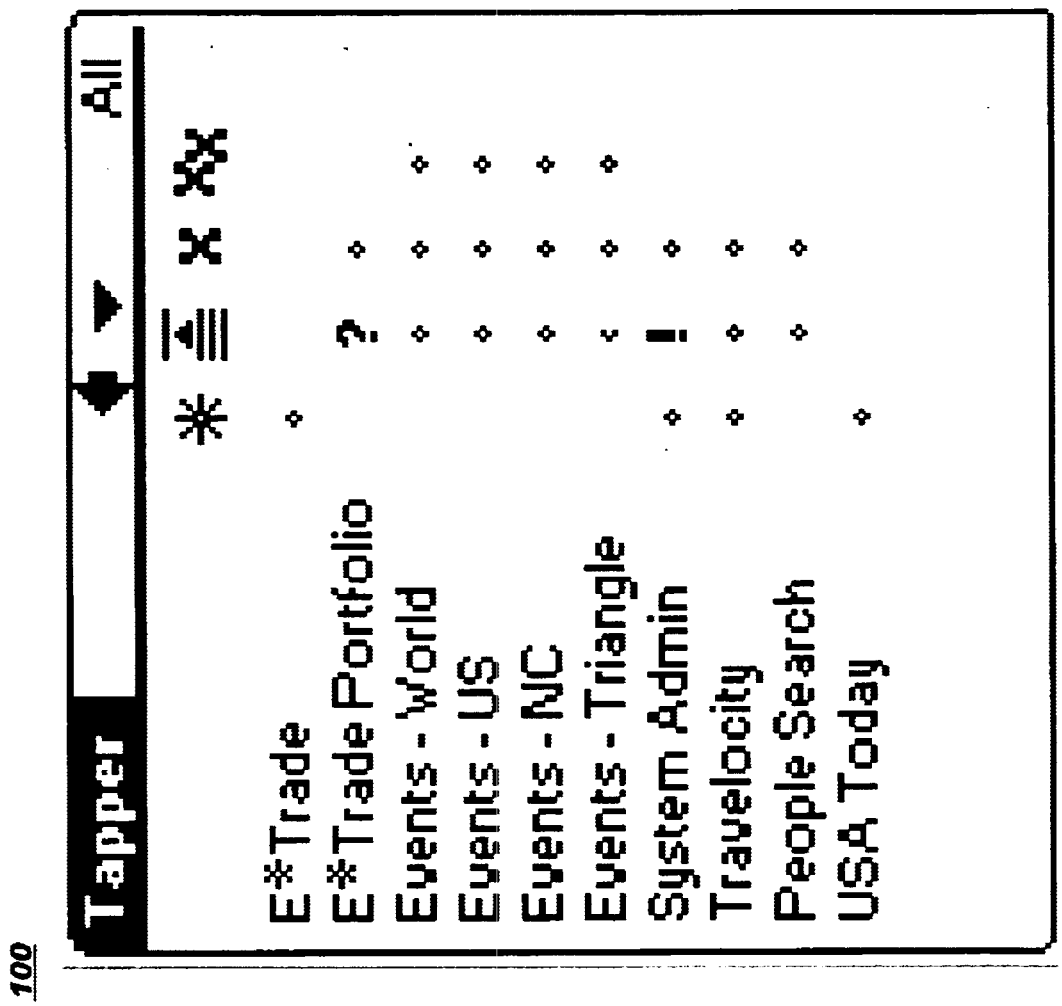

An exemplary embodiment of the improved user interface of the present invention is illustrated in FIGS. 1A–1E. (The content of FIGS. 1A and 1B is identical, except that the reference numbers which are used to assist in describing the application launcher appear in FIG. 1A but have been removed from FIG. 1B in order to more clearly illustrate the appearance of this novel user interface technique.) The application launcher of preferred embodiments is structured as a list of task names and a corresponding grid of information pertaining to a set of life cycle points for the tasks. The life cycle points preferably correspond to (1) the ability to start a task; (2) a current execution status of a task; and (3) the ability to stop a task. (In preferred embodiments, when a task is "stopped" by the user it is cancelled, although in alternative embodiments the stop function may be implemented as merely pausing task execution.) In some implementations, the present invention may be used with a multi-tasking operating system, such as Windows CE or Epoch32/Psion. In these implementations, an additional life cycle point may correspond to the ability to stop a group of executing tasks. Optionally, embodiments of the present invention may be adapted for allowing a user to add more life cycle points and/or to delete one or more of the provided life cycle points (although the start task and execution status life cycle points should be defined as basic functionality which is not capable of deletion).

A sample list of task names is shown at element 110 of FIG. 1A. The life cycle points are represented by columns 120, 130, 140, 150. To save display space, the function of each column is preferably depicted by a column heading which uses an iconic symbol or a limited number of representative characters. For purposes of illustration, a star symbol (*) is used for the Start Task column 120; a switch or stack symbol (see element 130 in FIG. 1A) is used for the Running Task column 130; an "X" is used for the Stop Task column 140; and an "$X_X$" symbol is used for the Stop All Tasks column 150. The grid 160 comprises a row for each task name from the list 110, where each row has an intersection with the column for each life cycle point. At each point of intersection, the grid may either be empty or it may contain a "tap point". As used herein, the term "tap point" refers to a small area of the display screen in which a graphical indicator is provided, where that graphical indicator may be tapped by the user with a pen to trigger a particular action. If there is no graphical indicator at an intersection point, then tapping there has no effect (although optionally, an indication such as an audible beep may be provided to signal the user). The presence of tap points at particular intersection points also provides certain status information to the user, as will be described in more detail herein. For purposes of illustration, a "dot" symbol is used herein as a default tap point symbol, as shown at 121.

By defining the user interface of the present invention with a grid approach, multiple functions may be performed for a particular task from this single view, providing significant usability improvements over the prior art user interface approach for pervasive computing devices.

As an example of how the tap points in grid 160 are used by the present invention to convey status information and to provide an improved pen-based interface, the presence of a tap point symbol 121 at the intersection of the row for the "E*Trade" task 111 and the Start Task column 120 indicates that this task is available to be started. Thus, if the user taps on this particular tap point, it will trigger execution of the E*Trade task. In this example, task 111 has not yet been started, and therefore there is no tap point for its row in any of the remaining columns 130, 140, or 150. On the other hand, the E*Trade Portfolio task 112 has a tap point 132 in the Running Task column 130 and another tap point 142 in the Stop Task column 140, indicating that this task is now running (but may be stopped if the user so desires). The absence of a tap point in the Start Task column 120 for this row indicates that the task 112 is not available to be started.

Tapping on a tap point from the Running Task column 130 causes the application launcher view 100 to be replaced with a task view corresponding to the task in the row of that tap point. For example, if tap point 129 is tapped, the application launcher will be replaced by a view for the "People Search" task 119.

In a basic embodiment of the present invention, only a single tap point symbol (i.e. the default symbol) is supported. (See FIG. 1E for a depiction of an example application launcher which only supports this basic symbol.) In a more advanced embodiment, tap points other than the default symbol are supported. These other symbols are preferably used to convey additional status information. For example, the tap point shown at 132 is depicted as a question mark "?". This tap point may be used in an implementation to indicate to the user that an underlying task is requesting user input. The tap point shown at 128 is depicted as an exclamation point "!". This symbol may be used to indicate that an underlying task needs to show the user some type of status information, such as an error message.

Figure 2A:
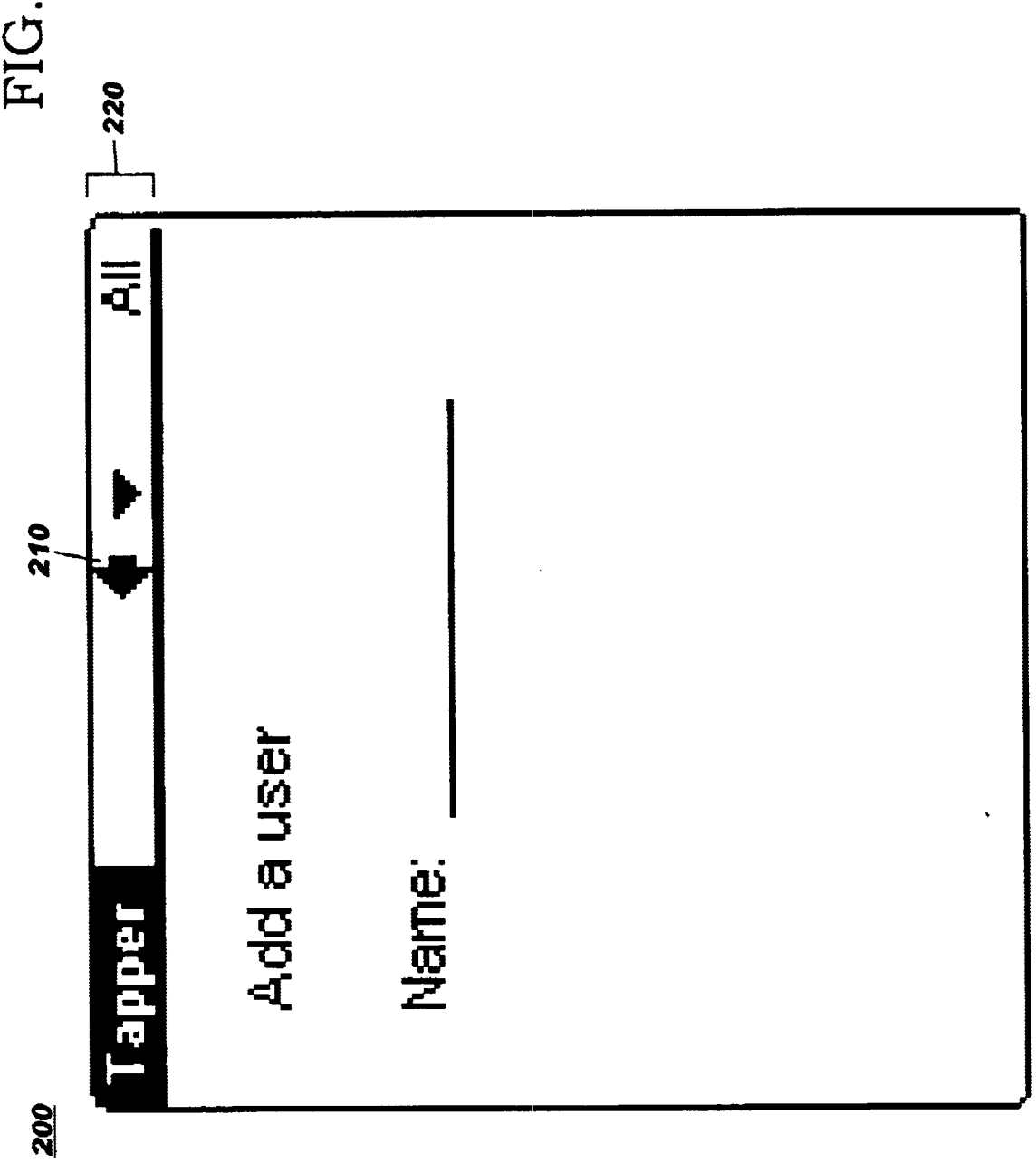
FIGS. 2A–2C depict sample task view displays which illustrate use of an optional feature of the present invention.

As an example of how the "?" may be used, suppose the E*Trade Portfolio task 112 is creating portfolio information and needs to know for whom this information is to be created. The presence of tap point 132 notifies the user that the task is awaiting user input. When the user taps on tap point 132, the application launcher will be replaced with a view pane for corresponding task 112. For example, a task view pane such as that illustrated as element 200 of FIG. 2A may be displayed. This example task view pane also illustrates an advantageous navigational mechanism provided by the improved user interface of the present invention, wherein a user may tap on the left-pointing arrow 210 (or other analogous symbol) to immediately return to the application launcher view 100 from a currently-displayed task pane view. Preferably, this return function is provided from all task view panes. By placing this arrow in the title bar (shown as element 220) of the task view panes, very little additional display space is consumed.

Figure 2B:
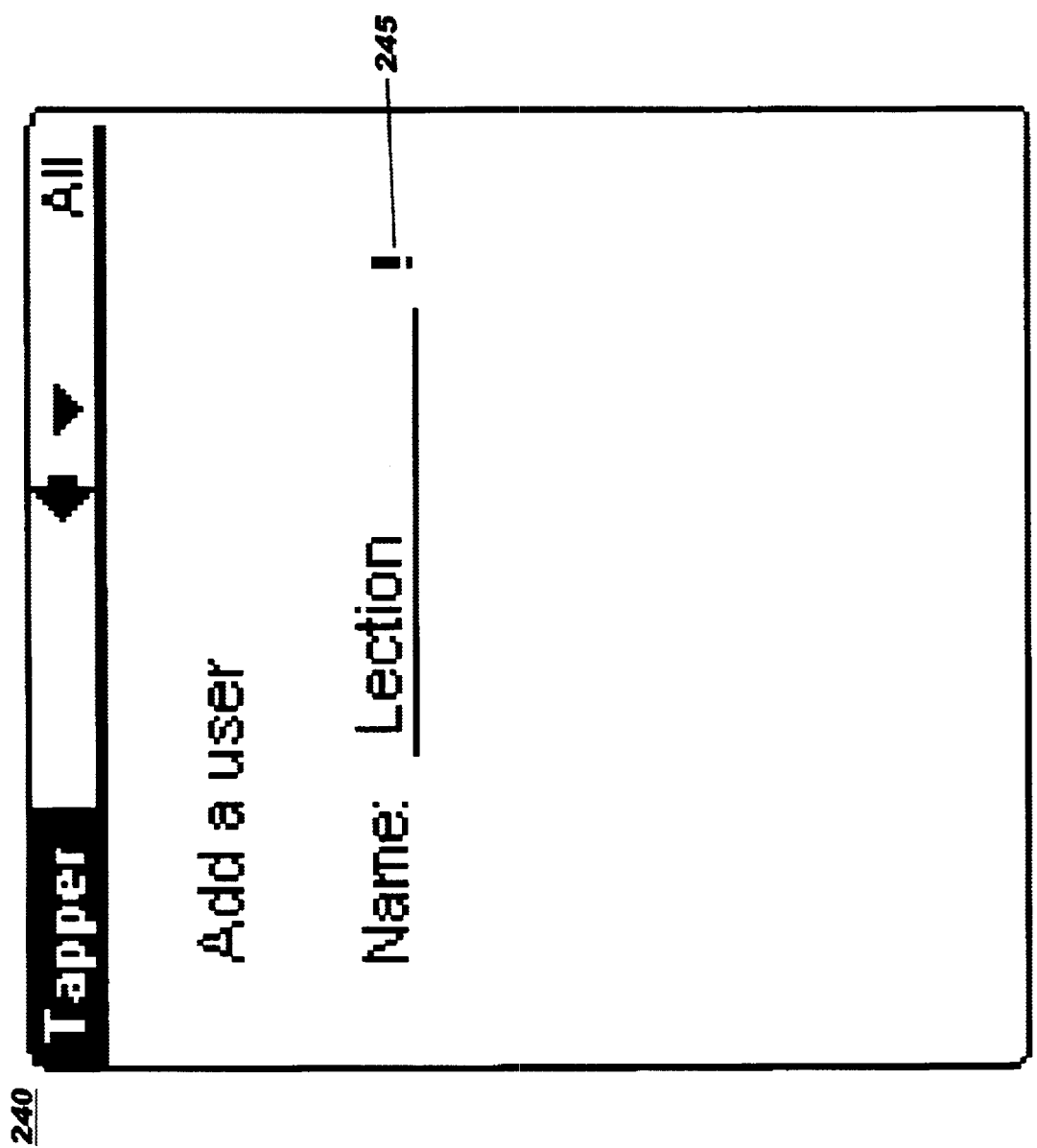
Figure 2C:
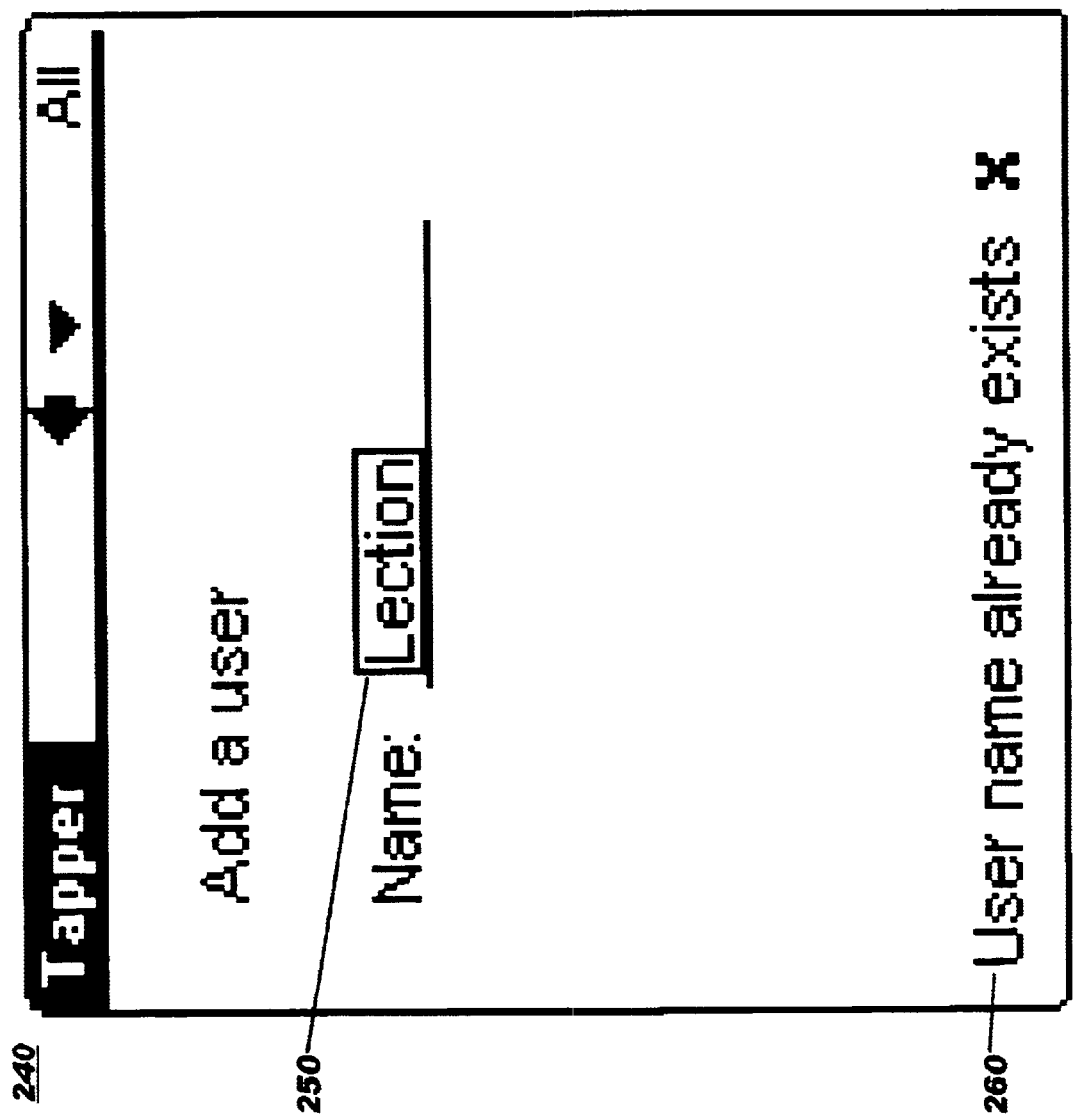

An example of using the "!" tap point is illustrated in FIGS. 2B and 2C. By tapping on tap point 128 for the System Admin task 117, the corresponding task view pane is then automatically surfaced. For purposes of illustration, suppose this task view pane is as shown at 240 in FIG. 2B. In preferred embodiments, the surfaced task view pane includes this same "!" symbol in proximity to the item to which the user's attention should be directed. In this example, the "!" symbol is placed at the end of an input field (see element 245) used for entering a user name, thereby conveying that there is some type of additional information available about this user name or perhaps about this input field. Upon tapping on the "!" in this pane, that information is preferably added to the task view pane, as shown at element 260 in FIG. 2C. In this case, the information is an error message pertaining to the input value "Lection". The entered input value associated with this error message may optionally be graphically highlighted in some manner, as illustrated at element 250 in FIG. 2C by surrounding the input value with a box. Preferably, the status information displayed at 260 includes a symbol that may be used to indicate acknowledgement of the message (which is an "X" in preferred embodiments). When the user is finished viewing this status information, he taps on this acknowledgement symbol, and in preferred embodiments, the task view pane is then automatically replaced by the application launcher pane. (In alternative embodiments, the status information may simply be removed from the task view pane, and the user may return to the application launcher pane at his convenience by tapping the left-facing "Return" arrow symbol. Furthermore, in alternative embodiments the status message may already be displayed upon surfacing the task view pane, such that the user is not required to tap on element 245 to see the message.)

In some implementations (e.g. those which do not support multi-tasking), it may be desirable to define the Start Task and Running Task columns 120, 130 as mutually exclusive, such that a tap point may appear in only one of these columns for a particular row at any given time. Typically, when a tap point is shown in the Running Task column 130, a tap point for that row is also displayed in the Stop Task column 140.

In preferred embodiments, tapping on the default tap point from the Stop Task column 140 causes a task view pane for the corresponding task to be surfaced, so that the user may see any information that may be presented therein prior to actually stopping the task's execution. Optionally, the user may also be allowed to confirm whether the task is to be stopped or not. (In alternative embodiments, the task may be stopped without surfacing the task view pane, if desired.) After the task is stopped, preferred embodiments may remove the tap points in columns 130 and 140 of this row and then display a tap point in column 120, indicating that the task has become available for (re-)starting. (Alternatively, the Start Task tap point may be displayed upon receiving an event or other similar notification from the underlying task, indicating that the task is available to be started.)

In advanced embodiments, the Stop Task column 140 may support use of the "!" symbol and/or a "C" symbol as tap points. Preferably, the "!" symbol is used to indicate that a task has ended with some condition that the user should be informed of. By tapping on this symbol, the task view pane will be surfaced. Preferably, an application programming interface ("API") is provided for use by executing tasks, and the task invokes this API to signal that the tap point should be changed to reflect the special tap point symbols discussed herein. The user can then see the information about the particular condition in the context of the task's view pane. Upon returning to the application launcher, the task is purged and the "!" tap point is removed.

A "C" tap point symbol in the Stop Task column preferably indicates that the underlying task completed normally. In such cases, there is typically no additional status information to show to the user, and the task preferably uses the API invocation to request changing the tap point to a "C" rather than to the "!" symbol. Thus, when the user taps on a "C" tap point, preferred embodiments simply terminate the task without surfacing its view pane.

Figure 1C:
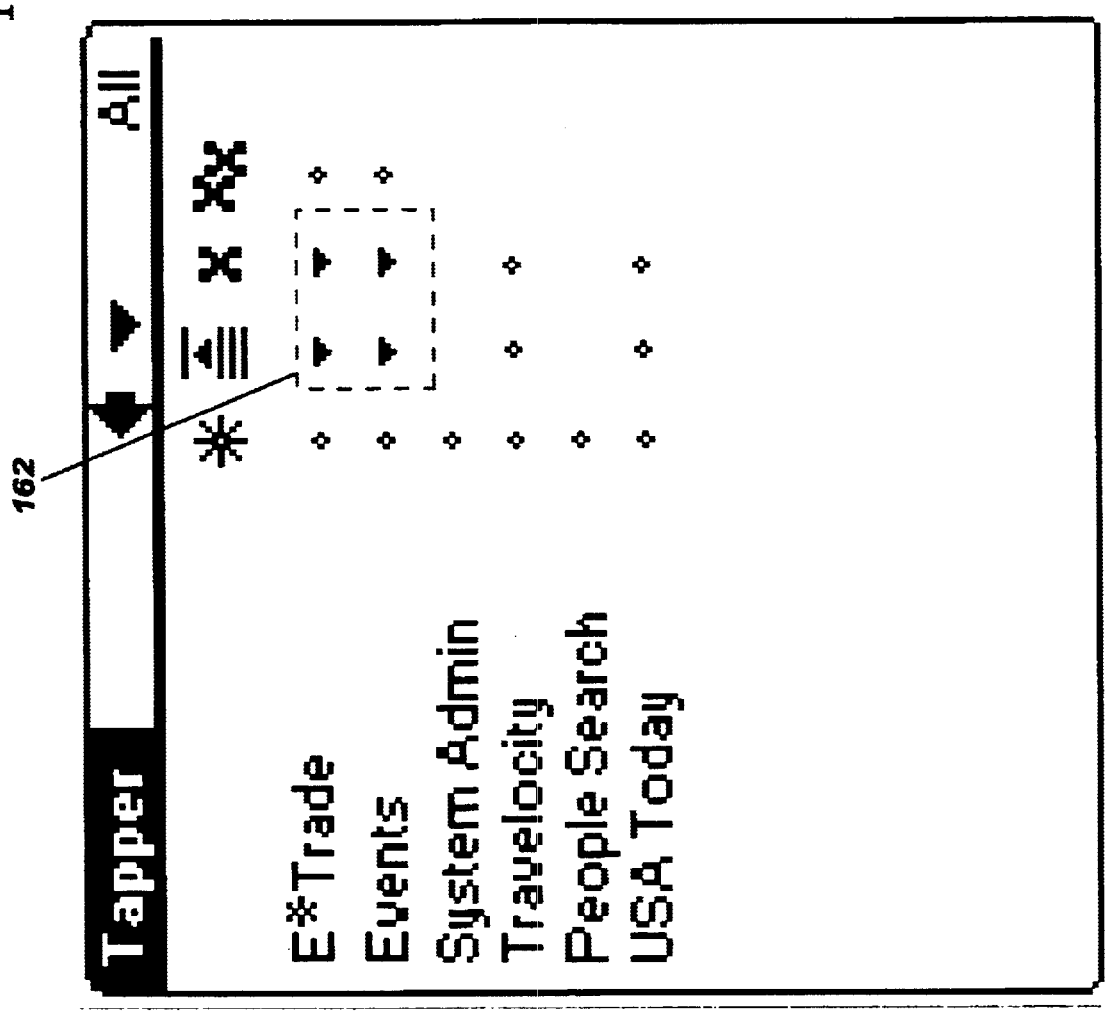
Figure 1D:
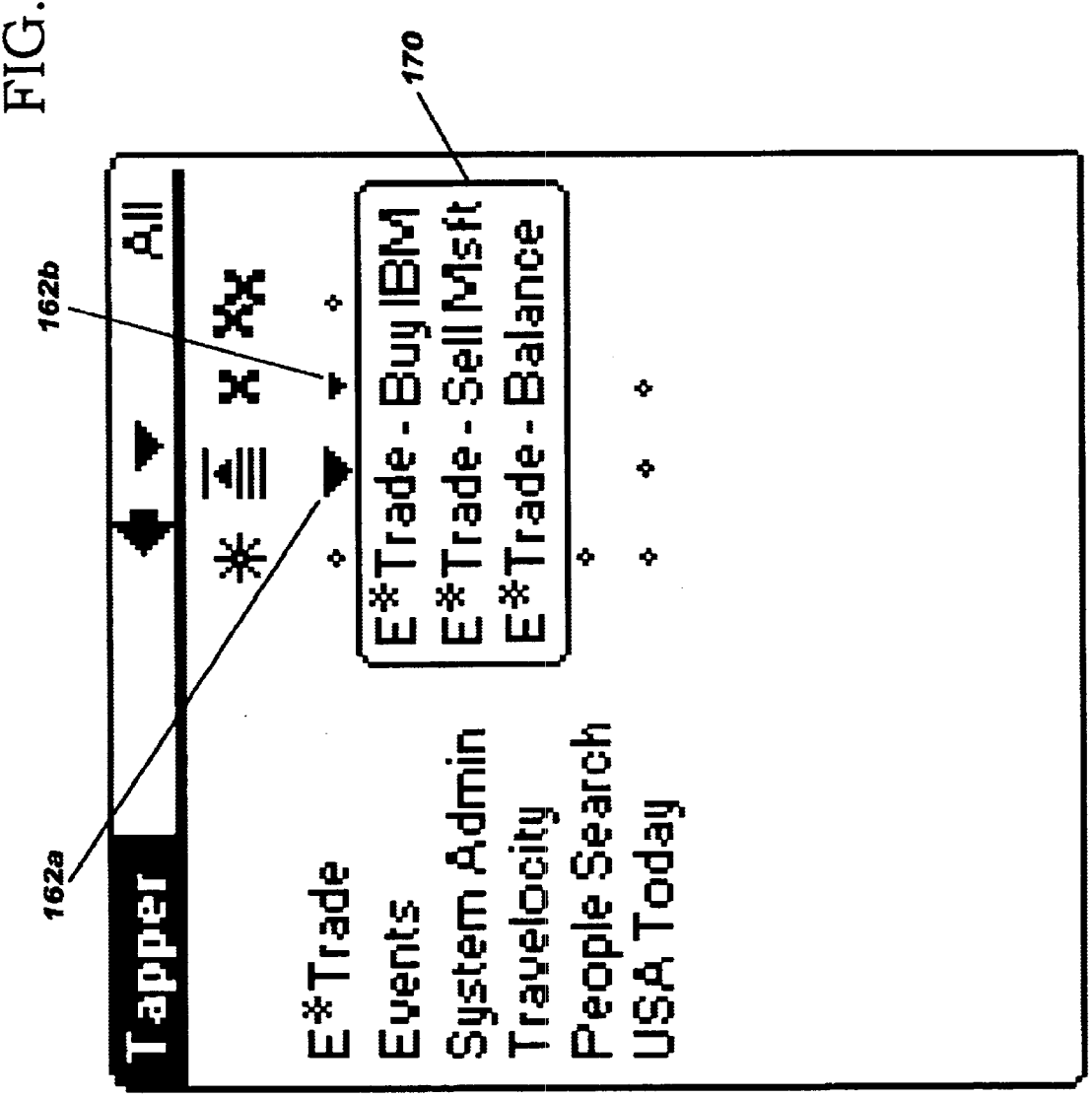
Figure 1E:
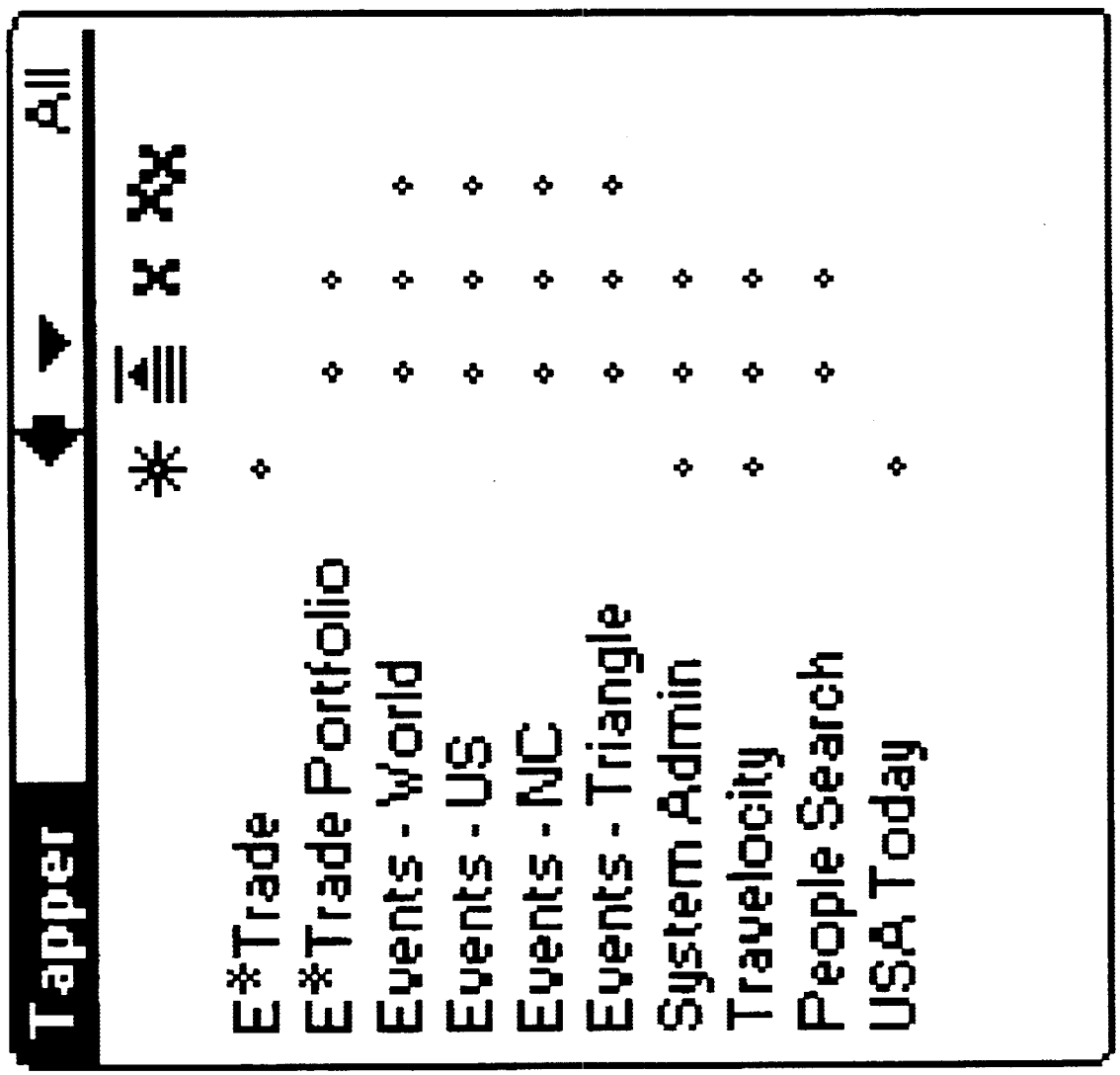

In a multi-tasking environment, more than one task may be executing at the same time, in which case multiple rows of grid 160 will contain tap points in column 130. In addition, more than one instance of a particular task may be executing at the same time. In this latter case, implementations of the present invention preferably provide for surfacing the task view of a predetermined one of these multiple instances, and optionally for stopping execution for a particular one of the instances, when a tap is received in column 130 or 140, respectively. The predetermined one may be selected in a number of different ways. For example, a record may be kept of which instance was most recently viewed, and that instance may then be selected. Or, the first instance to be started, or perhaps the last instance to be started, may be selected. When a "?" or "!" is displayed as a tap point in the Running Task column 130 for a task with multiple instances, then the instance to be surfaced is preferably the one which generated the event (e.g. the API invocation) causing this special status symbol to replace the symbol which was displayed. As yet another alternative, an explicit selection means may be provided whereby the user determines which instance the switch or stop tap applies to. An example of this latter technique is illustrated in FIG. 1C, where the tap points for the E*Trade task and the Events task are depicted as using downward-pointing arrows (see element 162), for purposes of illustration, to indicate to the user that a list is available for viewing here. FIG. 1D illustrates a result of tapping on the upper left one of these arrow symbols, wherein a pop-up view pane 170 is displayed to show the currently-running instances of the corresponding task. (Note that in this example, the tapped arrow 162a is shown slightly larger than arrow 162b, to emphasize to the user which arrow the pop-up view pane 170 corresponds to.) The user may then select one of these tasks from the list, e.g. by tapping on its displayed name.

In a multi-tasking environment where more than one instance of a particular task may be executing at the same time, implementations of the present invention may optionally provide for stopping execution of all such tasks with a single tap through use of the Stop All Tasks column 150. For example, FIG. 1A indicates that multiple instances of the "Events-NC" task 115 are running by the presence of the tap point 155, and the presence of this tap point also allows the user to stop all of them by touching the pen to the tap point.

A task display stack model is preferably used with the present invention, whereby the view pane at the top of the stack is the one currently displayed. According to preferred embodiments of the present invention, upon tapping on a tap point from the application launcher view, the launcher view 100 is automatically replaced by a task view pane for the task corresponding to the tapped point (as has been briefly discussed above). For example, upon tapping on tap point 128 for the System Admin task 117, the task pane 240 illustrated in FIG. 2B becomes the top entry on the task display stack, and is therefore displayed instead of application launcher 100. There are, however, a limited number of exceptions to this automatic replacement. In preferred embodiments, when a task is closed by selecting the "C" tap point from the Stop Task column or selecting the default tap point from the Stop All Tasks column of the application launcher view, the application launcher view remains on the display. In addition, when the pop-up view pane technique illustrated by FIGS. 1C and 1D is used, the application launcher is preferably only temporarily (and partially) overlaid with the pop-up view pane.

FIG. 3 illustrates the tap point symbols that may be supported in advanced embodiments of the present invention. A particular implementation may support one or more of these special tap point symbols. In addition, an implementation may optionally modify the set of tap point symbols, e.g. to provide one or more additional tap point symbols to account for the unique semantics of particular tasks. It will be obvious to one of ordinary skill in the art how this additional functionality may be provided once the teachings disclosed herein are known. Furthermore, an optional user input mechanism may be supported whereby the user invokes functions of an API defined for use with the present invention to specify additional user-specific or application-specific tap point symbols and/or to change the provided symbols.

As shown at 300, the tap point symbols supported for the Start Task column of the application launcher are preferably (1) the dot symbol, which starts a new copy of a task and which serves as the default symbol, and (2) an "E", which represents an event occurrence that is being graphically conveyed to the user. The "E" symbol has not been described previously. This symbol may be used, for example, when an action has occurred in some currently-executing task—such as the user pressing a button or other application-specific condition—where a result of this action is that another task should be started. In this case, the task in which the action occurred invokes an API to signify that the currently-displayed tap point in the Start Task column 120 should be replaced with this "E" symbol. As another example, suppose that a systems administrator is responsible for maintaining an up-to-date employee list for a corporation, and that managers of this corporation are responsible for sending e-mail notifications to the systems administrator when new employees are to be added to the list. The systems administrator may have a task on his pervasive computing device which receives these e-mail messages and then automatically updates a tap point symbol in column 120 to reflect that an incoming message has arrived. By monitoring his pervasive computing device for this type of changes to the tap points, the systems administrator is informed of events indicating that the employee list needs to be modified and he can therefore start the necessary task. When this optional event symbol is supported, the associated incoming message or notification may optionally include data to be used as input parameter values for the task for which the event symbol is displayed. For example, suppose that the "Add a user" task shown in FIG. 2B is adapted for this type of automatic event notification and processing. The triggering incoming message may include the employee's name and employee number. One way in which this type of information may be provided is through use of a structured markup language document (such as an Extensible Markup Language, or "XML", document) passed with the incoming message. As an example, the following markup document may be used as input to signify that employee Joe Smith, who is employee number 12345, should be added:

```
<TASK-REQUEST>
    <ADD-USER>
        <USER>
            <LAST-NAME>Smith</LAST-NAME>
            <FIRST-NAME>Joe</FIRST-NAME>
            <EMP-NUM>12345</EMP-NUM>
        </USER>
    </ADD-USER>
</TASK-REQUEST>
```

Upon receiving this markup language document, the tag values may be stripped out and used to prime the task instance that is started when the user taps on the "E" tap point.

Referring again to FIG. 3, element 310 shows the tap point symbols that may be supported for the Running Task column. In preferred advanced embodiments, these comprise (1) the default (e.g. dot) symbol, (2) a question mark (?) symbol, and (3) an exclamation point (!) symbol. As in element 300, the default symbol is shown as a dot. When a dot symbol in the Running Task column is tapped, this indicates that the corresponding task view pane should be surfaced to the top of the task display stack (thereby replacing the display of the application launcher pane). As stated earlier, the "?" symbol is preferably used to indicate to the user that the corresponding task (or perhaps a particular instance thereof) is requesting user input, and the "!" symbol is preferably used to indicate that the corresponding task (or a particular instance thereof) needs to show the user some type of status information, such as an error message. Preferably, an implementation of the present invention provides support for API invocations from tasks encountering events of these types, and replaces the default "*" tap point with a "?" or "!" tap point upon detecting a corresponding API invocation.

In a multi-tasking environment, if there is more than one instance of a task running when its default Running Task tap point is tapped, then in preferred embodiments a predetermined selected one is surfaced, as has been described above. Rather than surfacing a selected event, a marquee-style presentation of all such executing instances for this task may be provided, where the user may then select an instance for viewing. For example, the user may hold the pen on this tap point while the marquee shows one instance after another, where he then lifts his pen to signal that the marquee should stop, and the last-viewed instance is brought to the top of the task display stack (and is thus available for the user to see).

Referring again to FIG. 3, element 320 shows that the tap point symbols supported in the Stop Task column 140 of advanced embodiments are preferably (1) the default symbol, which again may be a dot, and which may be tapped to indicate that a selected currently-running instance of the task in this row is to be stopped, (2) the "!" symbol, which has been described above, and (3) the "C" symbol, which has also been described above.

Finally, element 330 of FIG. 3 shows the default tap point symbol "*" for closing all instances of an executing task.

Figure 4:
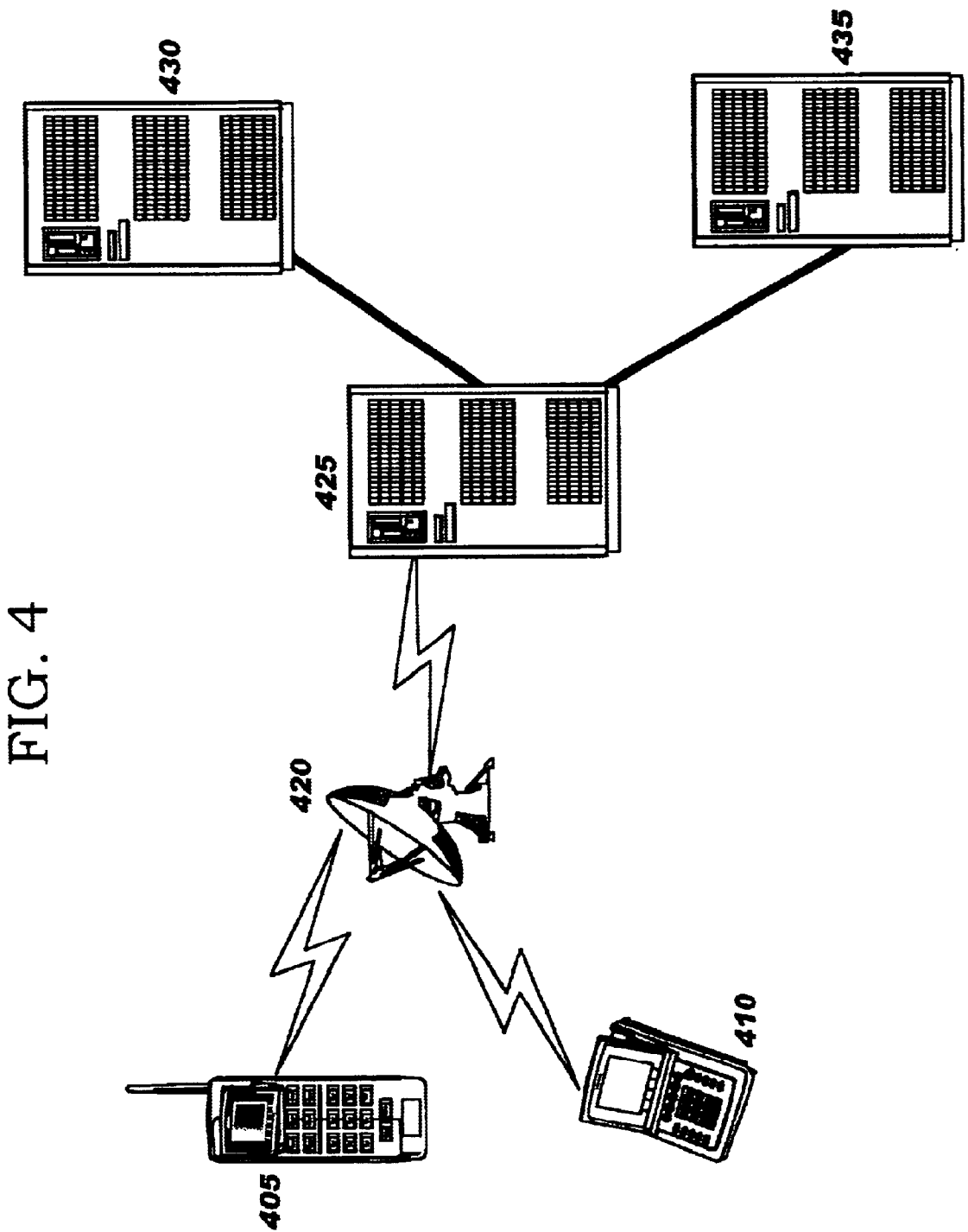
FIG. 4 illustrates a network in which the present invention may optionally be used.

Optionally, a pervasive computing device using the application launcher of the present invention may operate in a networking environment. A simple example of such a network is represented in FIG. 4, wherein example pervasive computing devices are shown as a Web-enabled cell phone 405 and PDA 410, connected using wireless network connections to a cellular tower 420 and then by land connections to a server 425 (which may be an edge server, proxy, firewall, or other networking device). Server 425 then connects to one or more other server-side devices 430 and 435, which may be Web application servers, legacy host application or database servers, and so forth.

FIGS. 5–12 provide flowcharts depicting logic that may be used in implementing preferred embodiments of the present invention. These flowcharts illustrate support for an advanced embodiment in which all tap point symbols and life cycle points discussed herein are supported. It will be obvious to one of ordinary skill in the art how the logic in the flowcharts which have been provided may be modified to provide a basic embodiment which supports only the default tap point symbol. (For example, all logic pertaining to symbols other than the default symbol may simply be omitted.) It will also be obvious how this logic may be modified to support a subset of the symbols, as well as additional or different symbols and life cycle points that may be supported in a particular implementation. Support for the basic embodiment (or for some subset of the features illustrated in FIGS. 5–12 for an advanced embodiment) may be particularly desirable on pervasive computing devices which have limited processing and/or storage capacity.

Figure 5:
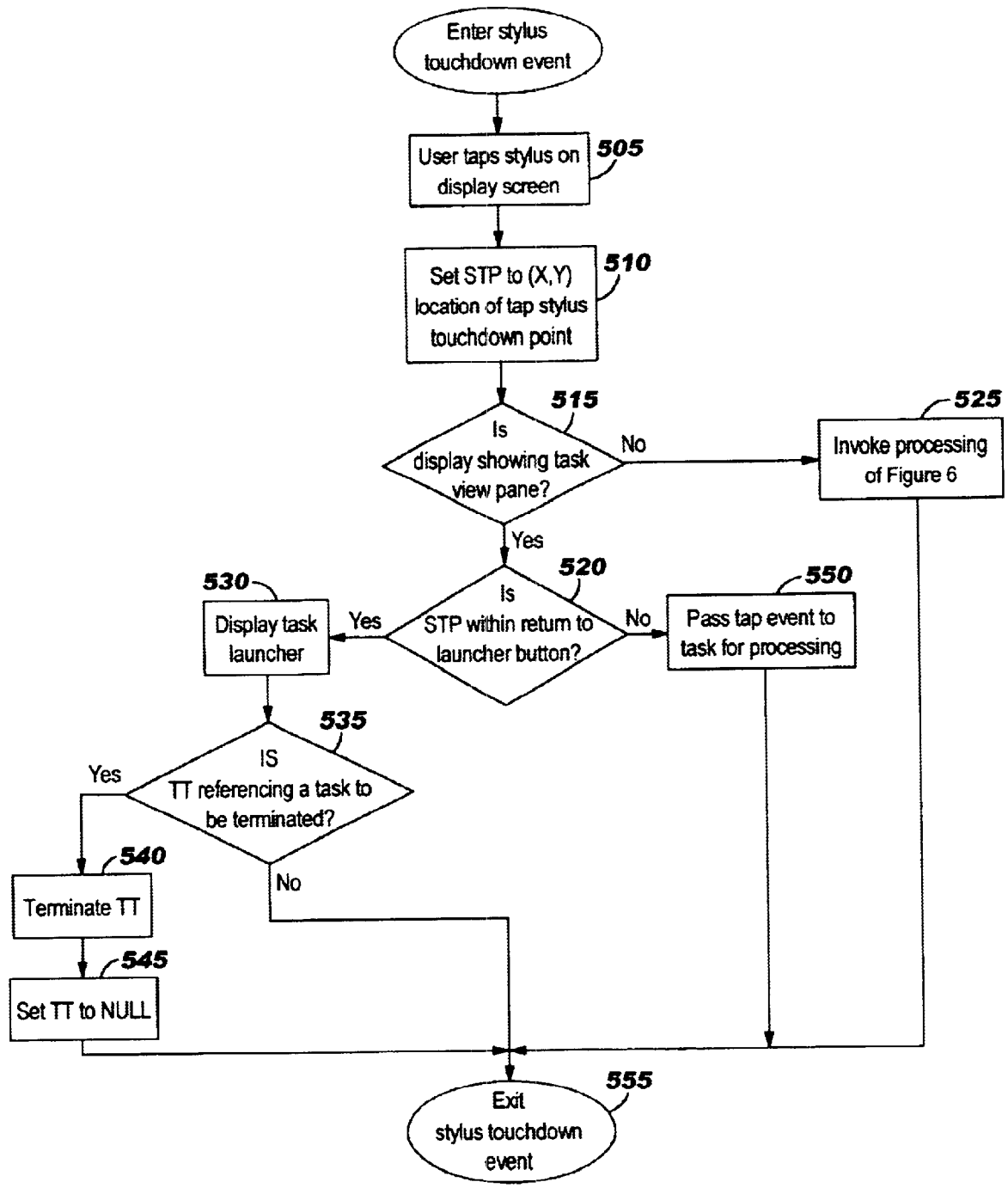
FIGS. 5–12 provide flowcharts depicting logic that may be used in implementing preferred embodiments of the present invention.

The logic of FIG. 5 is invoked when the user taps on the display screen of the pervasive computing device (and the operating system therefore detects an event such as "stylus touchdown"), as shown at 505. At Block 510, a variable "STP" (stylus touchdown point) is set to the (X, Y) coordinate location of the tap. Block 515 tests whether a task view pane is currently displayed. If not (i.e. the application launcher pane is displayed), then control transfers to FIG. 6, as shown at 525. Upon returning from this invocation, the processing of FIG. 5 will end, as shown at 555. Otherwise (i.e. the task view pane is displayed), processing continues to Block 520 which checks to see if the STP is within the "return to launcher" indicator (such as the left-facing arrow 210 of FIG. 2A). If so, then Block 530 causes the application launcher view to be redisplayed, and processing continues at Block 535. Otherwise, Block 550 passes the tap event to the executing task for application-specific processing, and the processing of FIG. 5 ends. (As an example of this application-specific processing, if the user taps on element 245 of FIG. 2B, the application may then display the error message 260 shown in FIG. 2C.)

When processing reaches Block 535, a variable "TT" (terminate task) is evaluated to see if it references a task to be stopped. This variable is initially set to null, and may be set to reference a task by the processing in Block 1055 of FIG. 10 (as described below). If the variable currently has a null value, then the logic of FIG. 5 merely ends (see 555). Otherwise, the referenced task is terminated (Block 540) and the TT variable is reset to null (Block-545). The processing of FIG. 5 then ends for this tap event.

Figure 6:
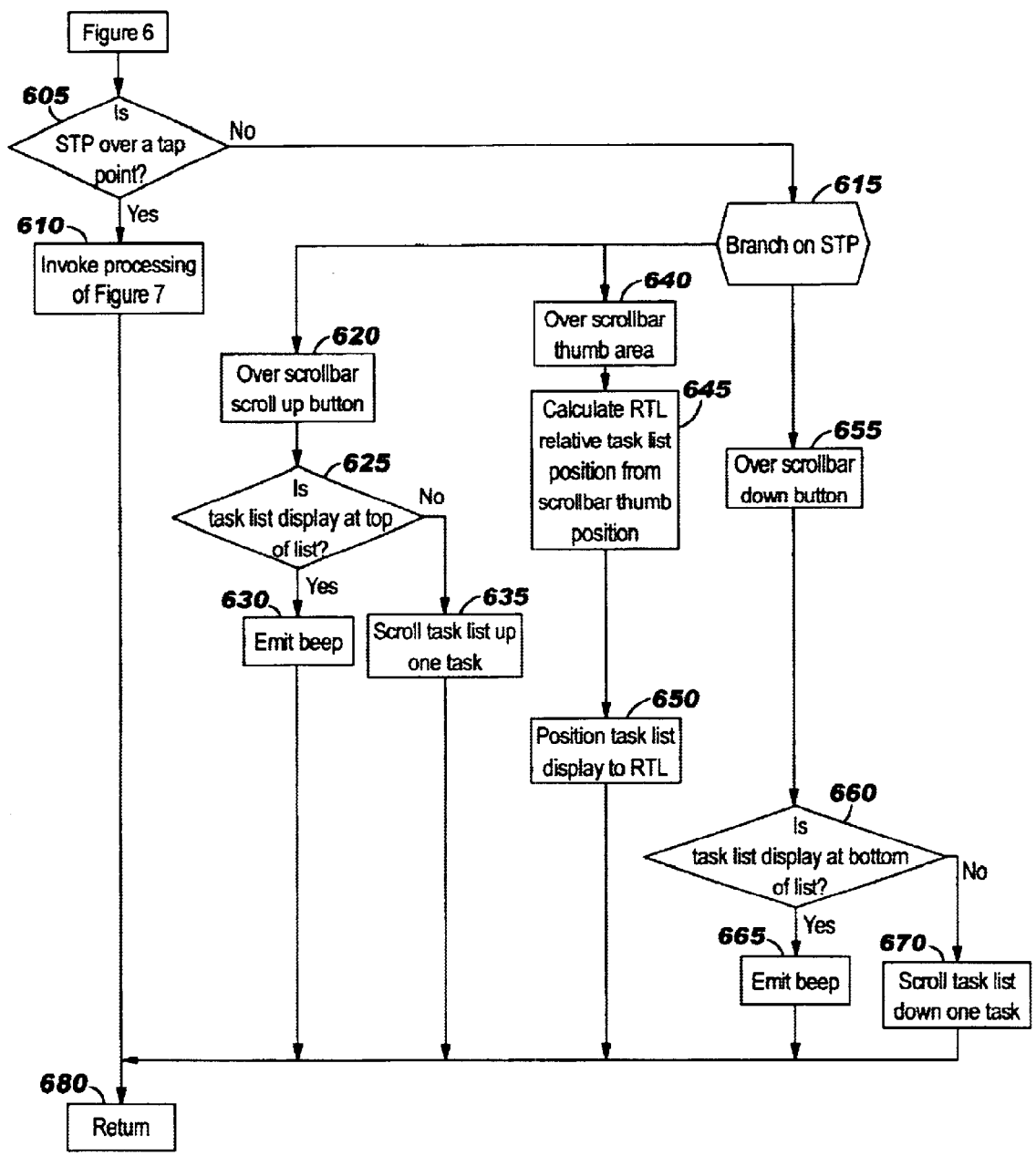
Figure 13A:
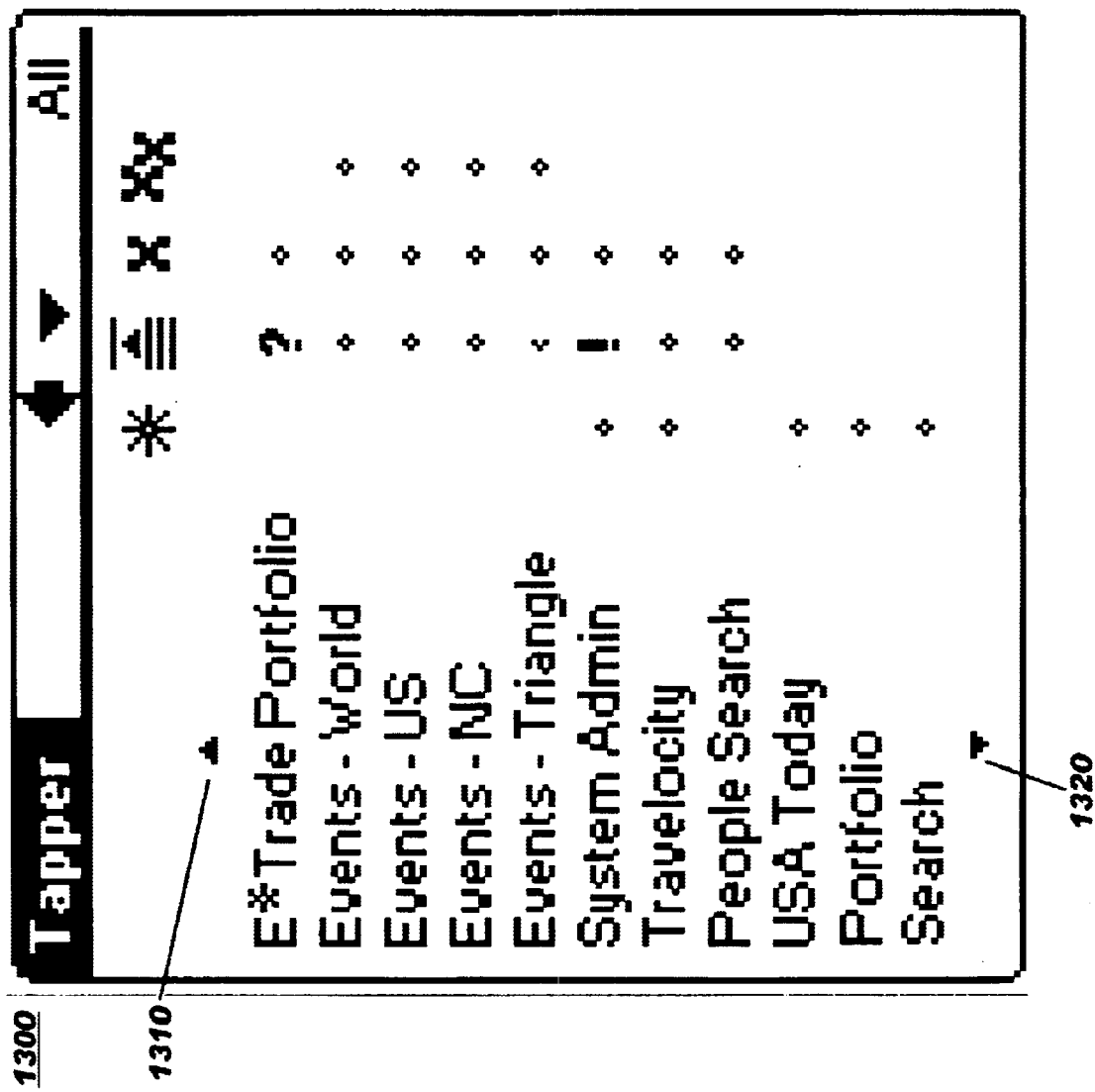
FIGS. 13A–13B illustrate additional features that may be provided in the improved user interface of the present invention.
Figure 13B:
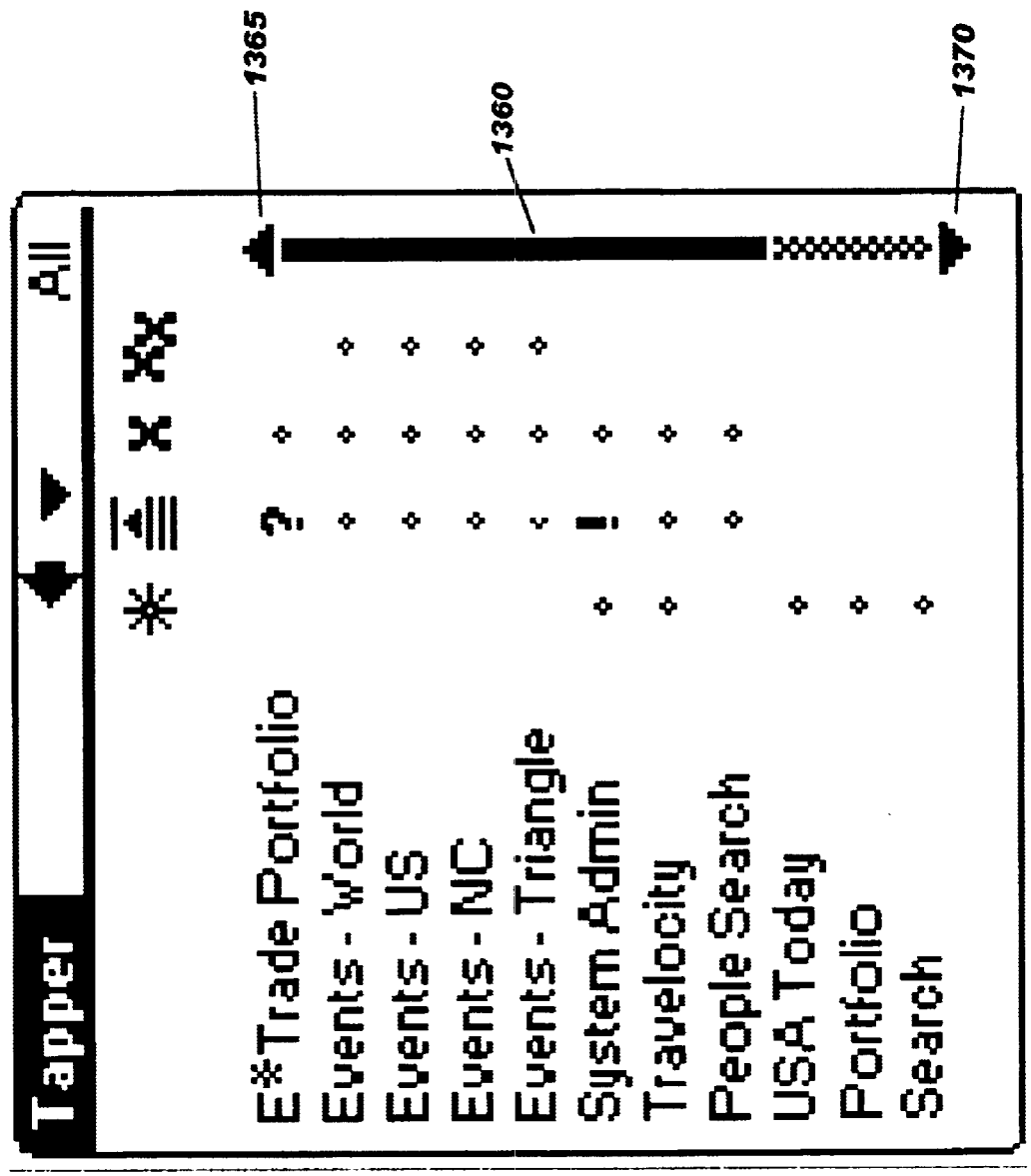

The logic of FIG. 6 is invoked from Block 525 of FIG. 5 to process a tap received while the application launcher view is displayed. At Block 605, a test is made to see if the STP indicates that the tap occurred over a tap point. If it did, then processing continues to FIG. 7, as indicated at 610. Otherwise, processing continues to Block 615, which tests to see if the tap may have been over another defined point. FIGS. 13A and 13B illustrate examples of such other defined points, which may optionally be supported by an implementation of the present invention. It may happen that a particular user has more tasks than can be displayed on a single view, in which case arrows (such as those illustrated at 1310 and 1320 of view 1300 in FIG. 13A) may be displayed. Or, a slider bar such as that shown at 1360 of FIG. 13B, which also has up and down arrows 1365 and 1370, may be used alternatively. Use of these graphical elements serves two purposes: it indicates to the user that additional information is available beyond what is displayed, and it provides a means for allowing the user to display that additional information.

Block 620 is reached when the user tapped over the "scroll up" indicator (illustrated by arrow 1310 of FIG. 13A and arrow 1365 of FIG. 13B). Block 625 then checks to see if the list of tasks being displayed is already at the top. If so, then Block 630 indicates that an audible beep (or other indicator) may be provided to inform the user. When the list was not at the top, Block 635 scrolls the task list upward (preferably, by one task at a time).

Block 640 is reached when the user tapped over the "thumb area" or slider bar indicator (illustrated at 1360 of FIG. 13B). Block 645 then calculates the relative task list position ("RTL") from the point where the slider was tapped, and Block 650 positions the task list accordingly. These techniques for slider bar manipulation are well known in the art, and will not be described in detail herein.

Block 655 is reached when the user tapped over the "scroll down" indicator (illustrated by arrow 1320 of FIG. 13A and arrow 1370 of FIG. 13B). Block 660 then checks to see if the list of tasks being displayed is already at the bottom. If so, then Block 665 indicates that an audible beep (or other indicator) may be provided to inform the user. When the list was not at the bottom, Block 670 scrolls the task list downward (preferably, by one task at a time).

Upon completing the processing of Block 630, 635, 650, 665, or 670, control returns to FIG. 5, as indicated as 680, after which the processing for this tap event is complete.

Figure 7:
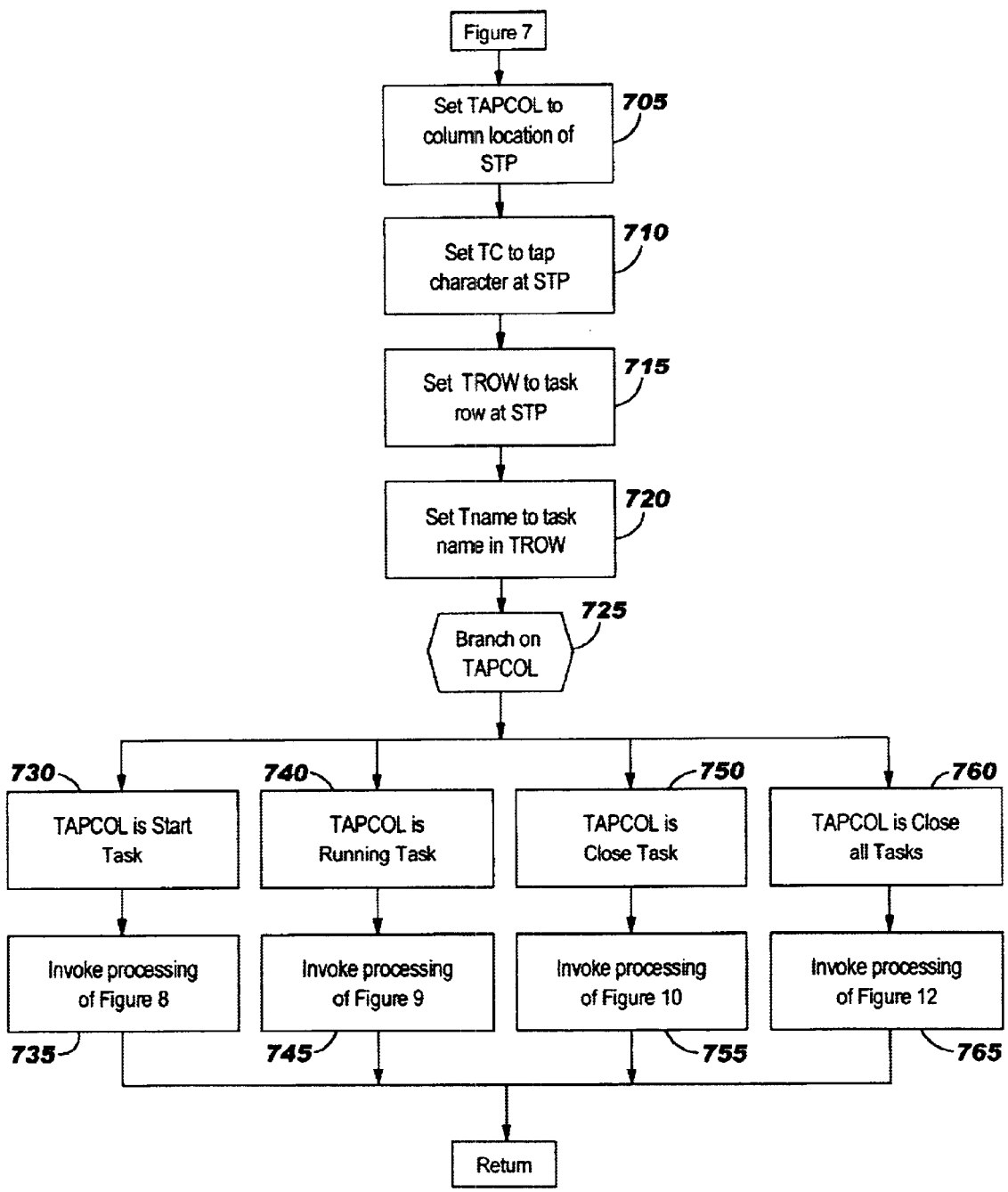
Figure 8:
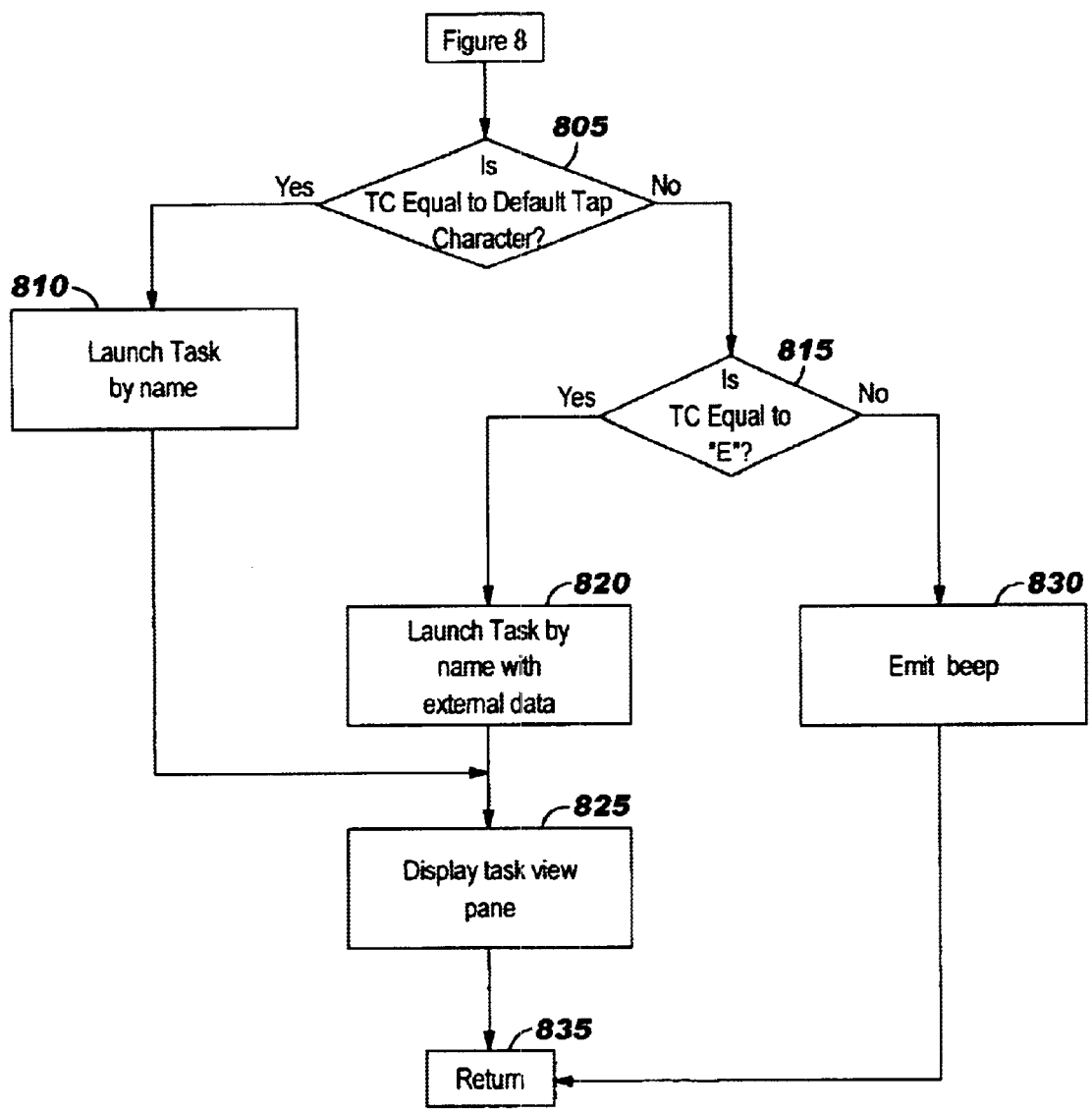
Figure 9:
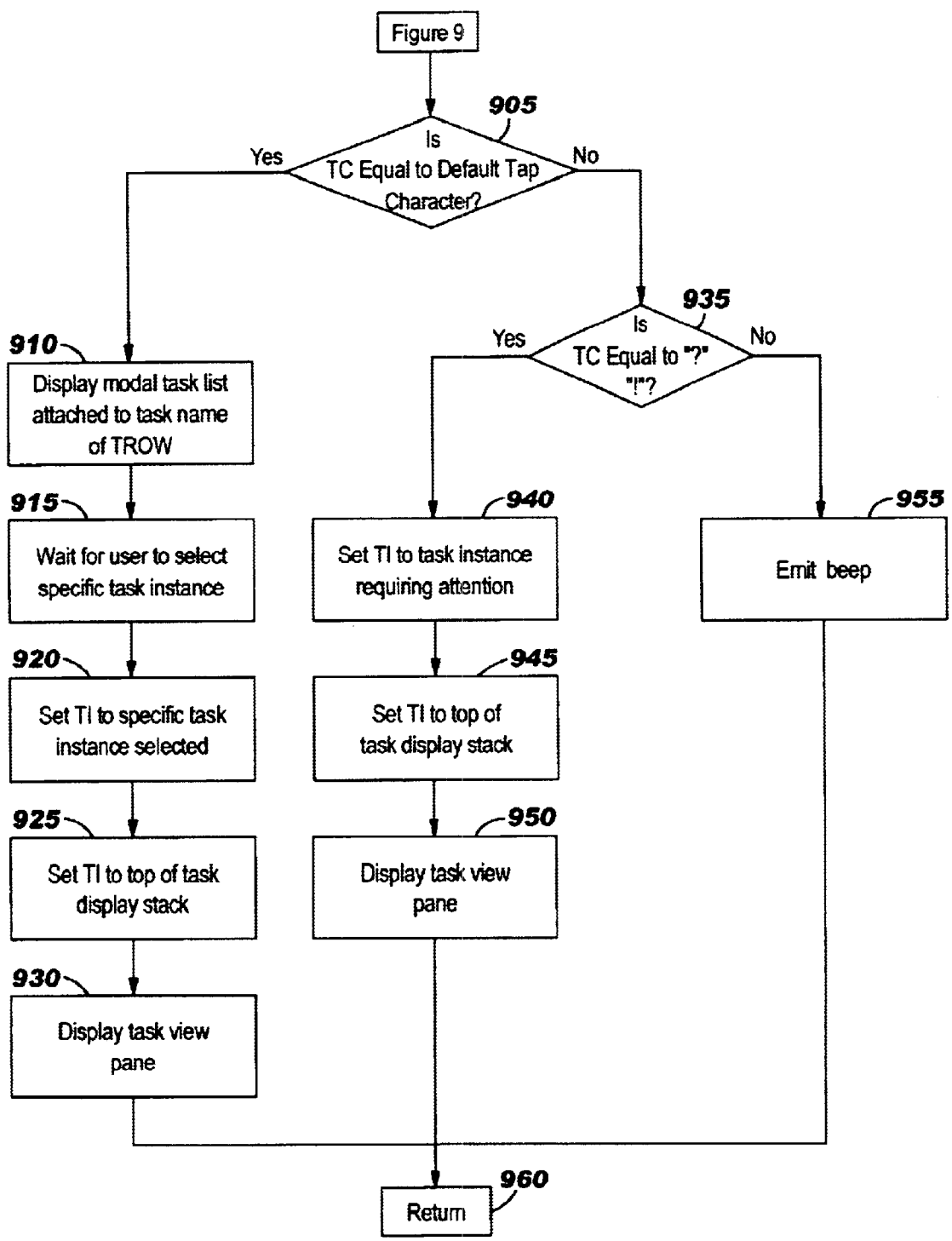

The logic of FIG. 7 is invoked from Block 610 of FIG. 6 to handle a tap received over a tap point on the application launcher. Block 705 sets a variable "TAPCOL" (tap column) to the column location of the STP. Block 710 then sets a variable "TC" (tap character) to the character or symbol at the point where the tap event was received. Block 715 sets a variable "TROW" (tap row) to the row in which the tap event was received, thereby reflecting the corresponding task from the task list. Block 720 sets a variable "TNAME" (task name) to the name of that task. Control then branches out from Block 725, depending on which column the tap was received over. If it was the Start Task column 120, then Block 730 receives control, and (at Block 735) the processing shown in FIG. 8 is invoked. If the tap was received over the Running Task column 130, then Block 740 receives control, and (at Block 745) the processing shown in FIG. 9 is invoked. Similarly, if the tap was received over the Stop Task column 140 or the Stop All Tasks column 150, then Blocks 750 and 755, or Blocks 760 and 765, invoke the processing shown in FIG. 10 or 12, respectively.

The logic of FIG. 8 processes tap events received over the Start Task column 120. Block 805 checks to see if the tap event was over the default tap point symbol. If so, then Block 810 launches the task from this row, and then transfers control to Block 825 where the task view pane for that task is displayed. Otherwise, when the tap was not over the default tap point, Block 815 checks to see if the tap event was over the "E" symbol. If it was, Block 820 launches the task from this row, and provides any externally-supplied data that may have been received. The task view pane for the launched task is then automatically displayed (Block 825), after which processing returns to the logic of FIG. 5 (as indicated at 835), and the processing of this tap event is complete. If the tap event was not over the default character or the "E", then thus is an invalid event and Block 830 preferably signals the user, after which processing returns to FIG. 5.

The logic of FIG. 9 processes tap events received over the Running Task column 130. Block 905 checks to see if the tap event was over the default tap point symbol. If so, then Block 910 preferably displays a modal task list attached to the task name associated with TROW. FIG. 1D illustrates this type of modal task list at element 170. After the user selects an instance from this list (Block 915), then a variable "TI" (task instance) is set to refer to that instance (Block 920). The task view pane for this instance is then moved to the top of the task display stack (Block 925), and the task view pane is displayed (Block 930).

Block 935 is reached when the tap event was not over the default tap point symbol, and checks to see if it was the "?" or "!" symbol instead. If not, then an indication is preferably provided to inform the user (Block 955). Otherwise, Block 940 sets TI to the task instance requiring attention. (The manner of determining the appropriate instance has been discussed above.) Block 945 then moves the task view pane for this instance to the top of the task display stack, after which the task view pane is displayed (Block 950).

After the processing of Block 930, 950, or 955, control returns to FIG. 5 (as shown at 960), where the processing of this tap event is then complete.

Figure 10:
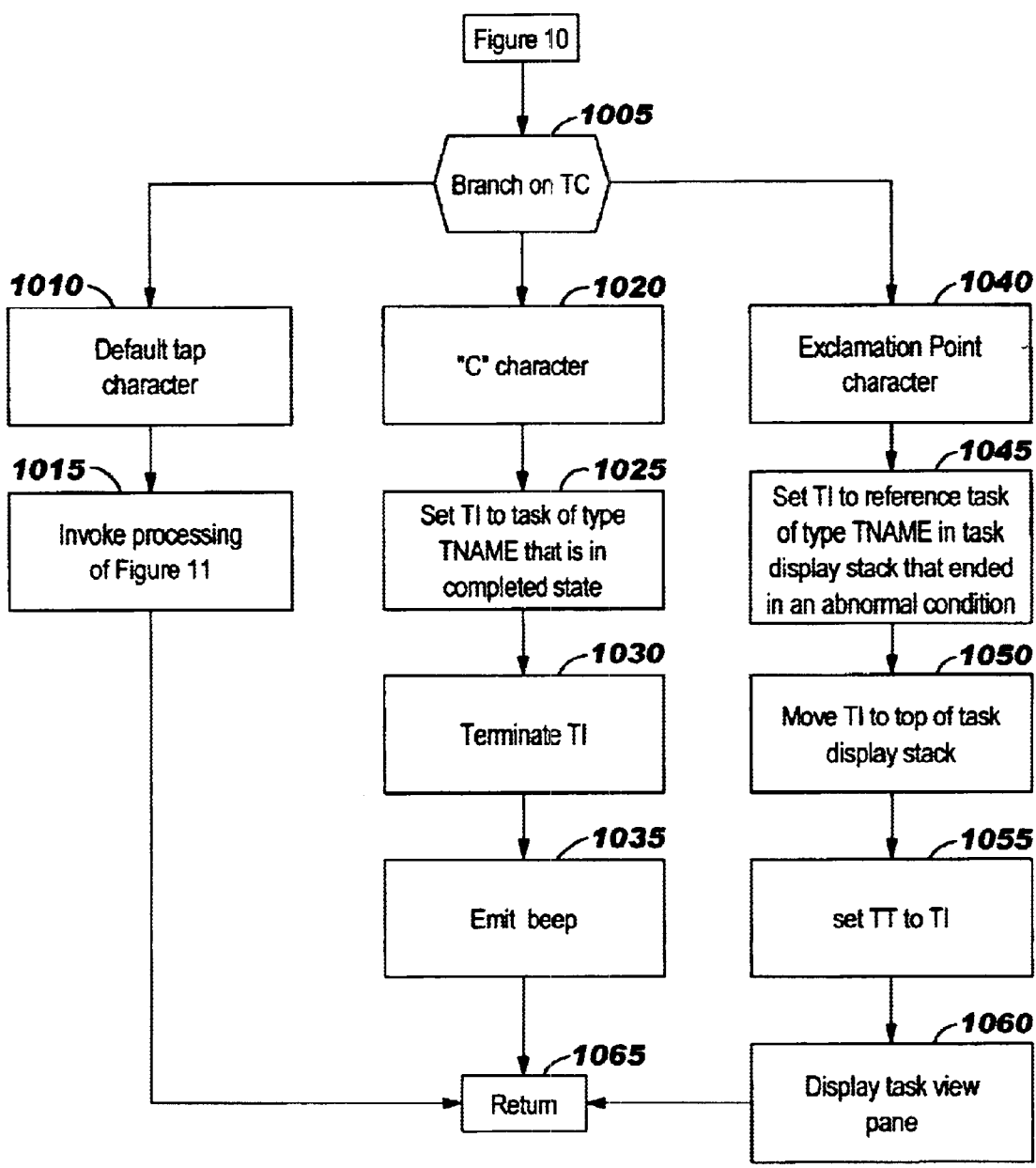

The logic of FIG. 10 processes tap events received over the Stop Task column 140. Block 1005 checks to see what tap point the tap event was over. If it was the default tap point symbol, Block 1010 receives control, and (in Block 1015) invokes the processing of FIG. 11.

If the tap event was received over the "C" character, then Block 1020 receives control. To process a tap event over the "C" character, Block 1025 sets TI to the task by this name (i.e. having the name TNAME saved in Block 720 of FIG. 7) which generated the API invocation causing the "C" to be displayed. At Block 1030, the task instance indicated by TI is terminated, and preferably an indicator such as an audible beep is emitted (Block 1035) to notify the user. Control then returns to FIG. 5, as indicated at 1065, after which the processing for this tap event is complete.

Block 1040 is reached when the tap event was over a "!" symbol. Block 1045 sets TI to reference the task of this name that ended in the abnormal condition which triggered the display (e.g. via an API invocation) of the "!", and Block 1050 moves this task to the top of the task display stack. Block 1055 sets variable TT (discussed at Block 535 of FIG. 5) to refer to this task, and Block 1060 displays that task view pane. Processing then returns to FIG. 5 (see 1065).

Figure 11:
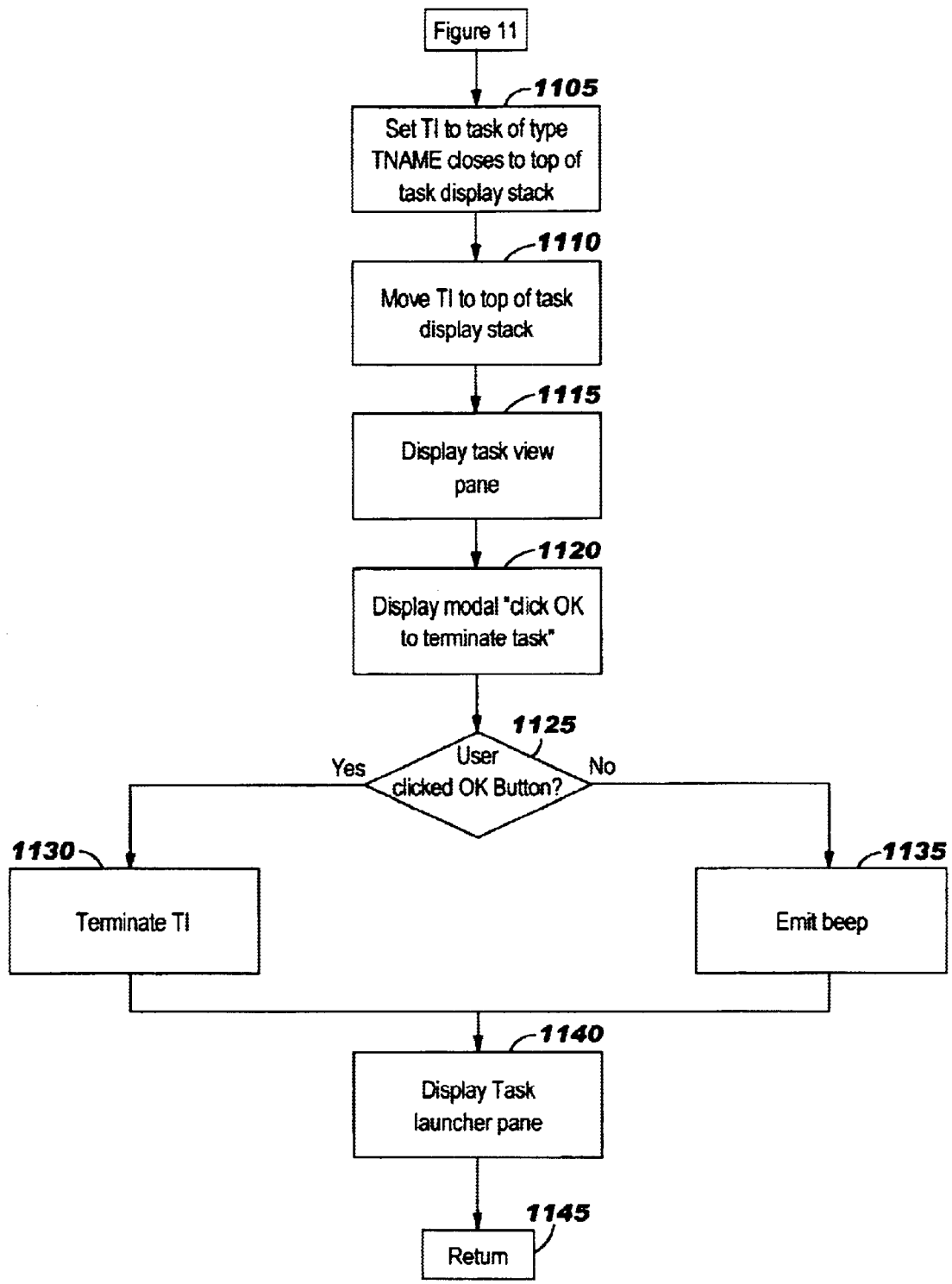

The logic in FIG. 11 processes a tap event received over the default symbol in the Stop Task column 140. Block 1105 sets TI to reflect the task of this name which is closest to the top of the task display stack (i.e. the most recently viewed instance). (Other techniques for determining which instance the tap event applies to have been described above, and may be easily reflected by appropriate modification of FIG. 11.) The task view pane for this task is then moved to the top of the task display stack (Block 1110) and displayed (Block 1115). Preferably, a modal graphical element (e.g. an "OK" button or similar graphic) is displayed (Block 1120), enabling the user to confirm whether the task should be terminated or not. Block 1125 checks to see what was entered. If the user clicked on the "OK" button, then the task is terminated (Block 1130). Otherwise, an indication such as an audible beep may be emitted (Block 1135). In either case, the application launcher view is re-displayed (Block 1140), after which control returns to FIG. 5 (as indicated at 1145) and the processing of the tap event is complete.

Figure 12:
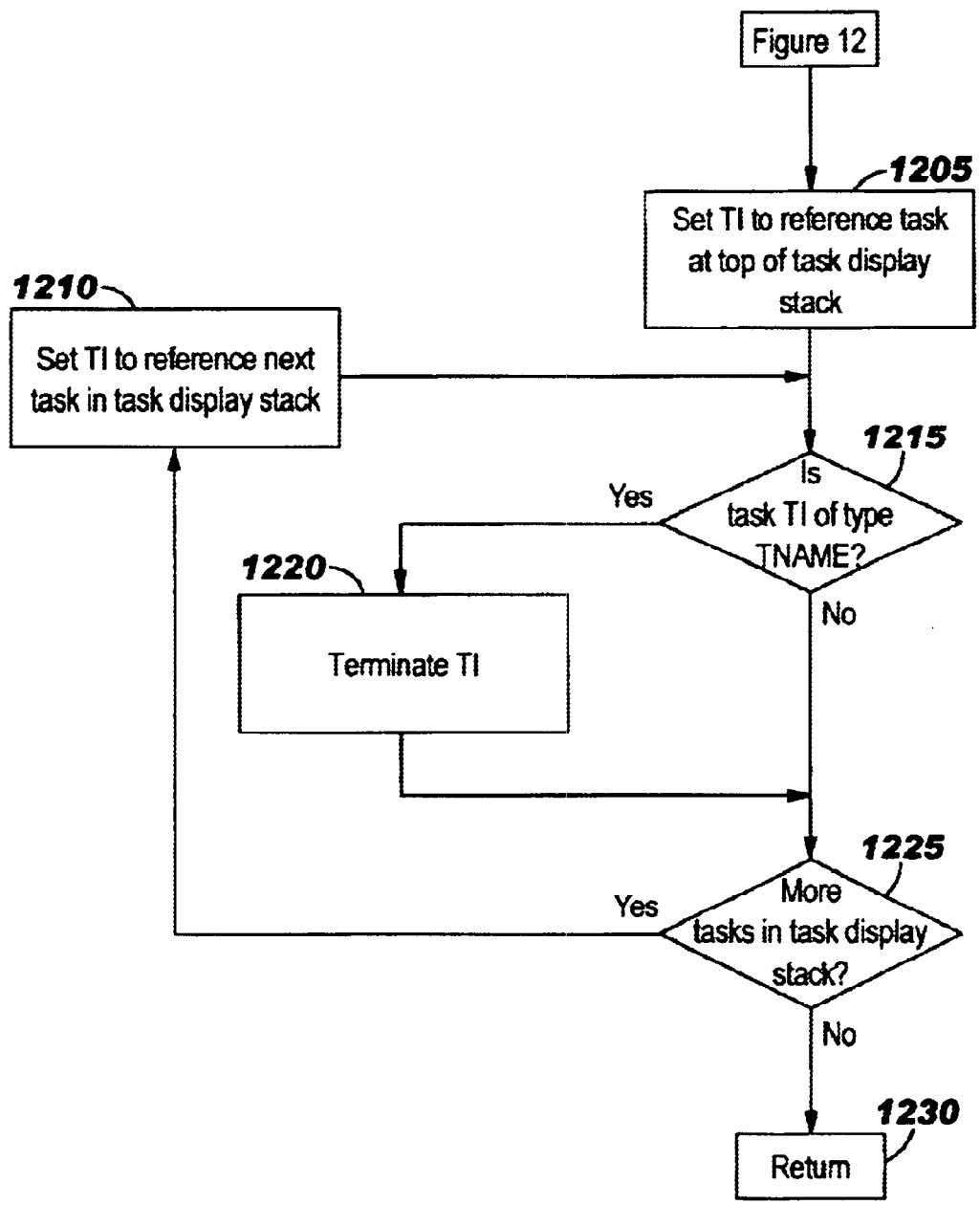

The logic in FIG. 12 processes tap events received over the Stop All Tasks column 150. At Block 1205, TI is set to reflect the task currently at the top of the task display stack. Block 1215 then checks to see if this task's name matches the value previously stored in TNAME (set in Block 720 of FIG. 7). If so, then this is one of the tasks to be stopped, and Block 1220 terminates this instance. If not (and also after Block 1220), control reaches Block 1225 which checks to see if there are any more tasks in the task display stack. If not, then control returns to FIG. 5 (as indicated at 1230), after which processing for this tap event is complete. If there are more tasks in the task display stack, then the test in Block 1225 has a positive result and control reaches Block 1210 which sets TI to refer to the next task in the stack. The logic at Block 1215 then iterates again, thereby locating each task to be stopped.

As has been demonstrated, the present invention provides an improved user interface and improved techniques for interacting with users of pervasive computing devices. Multiple functions per task are supported, and status information is provided, all from the application launcher view.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or flow diagrams of methods, apparatus (systems) and computer program products according to embodiments of the invention. It will be understood that each block of the flowchart illustrations and/or flow diagrams, and combinations of blocks in the flowchart illustrations and/or flows in the flow diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or flow diagram block(s) or flow(s).

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or flow diagram block(s) or flow(s).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or flow diagram block(s) or flow(s). Furthermore, the instructions may be executed by more than one computer or data processing apparatus.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiments and all such variations and modifications as fall within the spirit and scope of the invention.

We claim:

1. A user interface displayed on a pervasive computing device, the user interface comprising:
   a graphical representation identifying each of a collection of one or more tasks which are currently executing or executable on the pervasive computing device; and
   an execution status display area corresponding to the graphical representation of the collection, wherein the execution status display area indicates execution status information for each of the one or more tasks, including whether the task is currently executing or is executable, and also provides graphical symbol indicating, for each of the tasks in the collection, each of one or more available functions that can be performed on that task, whereby a user of the pervasive computing device can perform any of the available functions on the tasks by activating its graphical symbol, and wherein an available function for executable ones of the tasks is to cause that task to begin executing and an available function for currently-executing ones of the tasks is to cause that task to stop executing.

2. An improved user interface for a pervasive computing device, the improved user interface comprising a multi-functional application launcher view and a plurality of task views, wherein a user of the pervasive computing device selectively navigates between the multi-functional application launcher view and selected ones of the task views, and wherein:

the multi-functional application launcher view comprises:
a displayed list of tasks available for execution by the pervasive computing device;
a displayed grid corresponding to the displayed list of tasks, wherein the displayed grid comprises a plurality of columns and a row for each task in the displayed task list, each of the columns corresponding to life cycle points for the displayed list of tasks; and
displayed entries in the grid at selected intersections of the columns and the rows, wherein the displayed entries provide execution status information about particular life cycle points of the task associated with that row or graphical depictions that may be activated to perform actions for particular life cycle points of the task associated with that row; and
each of the task views provides information pertaining to that one of the tasks that is associated with the task view.

3. The improved user interface according to claim 2, wherein selected ones of the graphical depictions enable performing an action that launches execution of the task associated with that row.

4. The improved user interface according to claim 2, wherein at least one of the displayed enables performing a plurality of actions relative to a selected one of the tasks in the displayed list.

5. The improved user interface according to claim 2, wherein the actions include (1) starting execution of a selected task and (2) surfacing the task view for a selected task.

6. The improved user interface according to claim 5, wherein the actions also include stopping execution of a selected task.

7. An improved user interface for a pervasive computing device, the improved user interface comprising a multi-functional application launcher view and a plurality of task views, wherein a user of the pervasive computing device selectively navigates between the multi-functional application launcher view and selected ones of the task views, and wherein the multi-functional application launcher view comprises:

a displayed list of tasks available for execution by the pervasive computing device; and
a displayed grid corresponding to the displayed list of tasks, wherein the displayed grid comprises a plurality of columns and a row for each task in the displayed task list and entries at intersections of selected ones of the columns and the rows, wherein the entries provide status information for the tasks in the displayed list, wherein the status information includes (1) which tasks are executing, (2) which tasks are requesting input from the user, and (3) which tasks have information to display to the user.

8. The improved user interface according to claim 7, wherein the status information also includes a notification that a particular task should be started by the user.

9. The improved user interface according to claim 8, wherein the notification is received because of an event which occurred in another task.

10. The improved user interface according to claim 8, wherein the notification is received because a message arrived for the user, and wherein the message indicates that the particular task should be started.

11. The improved user interface according to claim 10, wherein the message includes input values to be used by the particular task when it is started.

12. The improved user interface according to claim 11, wherein the input values are encoded within a structured markup language document.

13. The improved user interface according to claim 7, wherein the status information also includes which tasks have completed normally.

14. The improved user interface according to claim 7, wherein the status information also includes which tasks have completed abnormally, and wherein the user may see the task view of a selected one of the tasks that have completed abnormally by activating the entry providing the status information of the selected task.

15. The improved user interface according to claim 4, wherein the plurality of actions comprises stopping execution of multiple instances of the selected one of the tasks.

16. The improved user interface according to claim 2, wherein the user activates a selected one of the graphical depictions, thereby causing an action to be performed by tapping the selected one with a stylus or pen input device.

17. The improved user interface according to claim 5, wherein the actions also include stopping execution of a selected group of tasks.

18. The improved user interface according to claim 17, wherein the selected group comprises multiple instances of a particular task from the displayed list.

19. The improved user interface according to claim 5, further comprising a graphical selection area on the surfaced task view for the selected task that may be activated by the user to return to the multi-function application launcher view.

20. A method of providing an improved user interface for a pervasive computing device, comprising steps of:
displaying a multi-functional application launcher view, comprising steps of:
displaying a list of tasks available for execution by the pervasive computing device;
displaying a grid corresponding to the displayed list of tasks, wherein the displayed grid comprises plurality of columns and a row for each task in the displayed task list, each of the columns corresponding to life circle points of the displayed list of tasks; and
displaying entries in the grid at selected intersections of the columns and the rows, wherein the displayed entries provide status information about particular life cycle points of the task associated with that row or graphical depictions of available actions for particular life cycle points of the task associated with that row; and
enabling a user of the pervasive computing device to selectively navigate between the multi-functional application launcher view and selected ones of a plurality of task views, wherein each task view provides information pertaining to one of the tasks in the displayed list.

21. The method according to claim 20, further comprising the step of enabling the user to modify the life cycle points.

22. The method according to claim 20, wherein the user activates one of the available actions by activating its graphical depiction in the grid.

23. The method according to claim 20, further comprising the step of revising a selected displayed entry when the task associated with that row has different status information.

24. The method according to claim 20, further comprising the step of revising a selected displayed entry when the task associated with that row has a different available action.

25. The method according to claim 24, wherein the step of revising further comprises the step of receiving an application programming interface invocation indicating the different available action.

26. The method according to claim 20, further comprising the step of displaying a graphical indication on the multi-functional application launcher view when the displayed list of tasks exceeds a display capacity of the pervasive computing device.

27. The method according to claim 20, wherein the available actions include (1) starting execution of a selected task and (2) surfacing the task view for a selected task.

28. The method according to claim 27, wherein the actions also include stopping execution of a selected task.

29. The method according to claim 27, wherein a plurality of instances of a selected task are executing, and further comprising the step of surfacing the task view of a particular one of the plurality when the user activates the graphical depiction for surfacing the task view of the selected task.

30. The method according to claim 29, wherein the particular one is the instance which was most recently viewed by the user.

31. The method according to claim 29, wherein the activated graphical depiction indicates that input is requested from the user, and wherein the particular one is the instance which is requesting the input.

32. The method according to claim 29, wherein the activated graphical depiction indicates that information is available for presenting to the user, and wherein the particular one is the instance which has the available information.

33. The method according to claim 29, wherein the particular one is selected by the user.

34. The method according to claim 33, wherein:
the activated graphical depiction indicates presence of the plurality;
a selectable representation of the plurality is presented to the user in response to the activation; and
the particular one is the instance which is selected by the user from the selectable representation.

35. The method according to claim 20, wherein the status information includes (1) which tasks are executing, (2) which tasks are requesting input from the user, and (3) which tasks have information to display to the user.

36. A system for providing an improved user interface for a pervasive computing device, comprising:

means for displaying a multi-functional application launcher view, comprising:
means for displaying a list of tasks available to the user for execution by the pervasive computing device;
means for displaying a grid corresponding to the displayed list of tasks, wherein the displayed grid comprises a plurality of columns and a row for each task in the displayed task list, each of the columns corresponding to life cycle points for the displayed list of tasks;
means for displaying entries in the grid at selected intersections of the columns and the rows, wherein the entries provide (1) status information about particular life cycle points of the task associated with that row, and (2) graphical depictions that may be activated to perform actions for particular life cycle points of the task associated with that row; and
means for enabling a user of the pervasive computing device to selectively navigate between the multi-functional application launcher view and selected ones of a plurality of task views.

37. A computer program product for providing an improved user interface for a pervasive computing device, the computer program product embodied on one or more computer-readable media and comprising:
computer-readable program code means for displaying a multi-functional application launcher view, comprising:
computer-readable program code means for displaying a list of tasks available to the user for execution by the pervasive computing device;
computer-readable program code means for displaying a grid corresponding to the displayed list of tasks, wherein the displayed grid comprises a plurality of columns and a row for each task in the displayed task list, each of the columns corresponding to life cycle points for the displayed list of tasks; and
computer-readable program code means for displaying entries in the grid at selected intersections of the columns and the rows, wherein the entries provide (1) status information about particular life cycle points of the task associated with that row, and (2) graphical depictions that may be activated to perform actions for particular life cycle points of the task associated with that row.

38. The computer program product according to claim 37, further comprising computer-readable program code means for enabling a user of the pervasive computing device to selectively navigate between the multi-functional application launcher view and selected ones of a plurality of task views.

* * * * *